US012563417B2

(12) United States Patent
HuangFu et al.

(10) Patent No.: US 12,563,417 B2
(45) Date of Patent: Feb. 24, 2026

(54) INFORMATION SHARING METHOD AND COMMUNICATION DEVICE

(71) Applicant: HUAWEI TECHNOLOGIES CO., LTD., Guangdong (CN)

(72) Inventors: Yourui HuangFu, Hangzhou (CN); Bin Hu, Shenzhen (CN); Jian Wang, Hangzhou (CN); Rong Li, Hangzhou (CN); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 315 days.

(21) Appl. No.: 18/336,004

(22) Filed: Jun. 15, 2023

(65) Prior Publication Data

US 2023/0328549 A1 Oct. 12, 2023

Related U.S. Application Data

(63) Continuation of application No. PCT/CN2021/127298, filed on Oct. 29, 2021.

(30) Foreign Application Priority Data

Dec. 24, 2020 (CN) .......................... 202011553076.9

(51) Int. Cl.
*H04W 24/02* (2009.01)
(52) U.S. Cl.
CPC .................................... *H04W 24/02* (2013.01)
(58) Field of Classification Search
CPC ....... H04W 24/02; H04W 4/025; G06N 3/092

USPC ............................................. 455/422.2, 422.1
See application file for complete search history.

(56) References Cited

U.S. PATENT DOCUMENTS

| | | | | |
|---|---|---|---|---|
| 7,600,022 | B2 * | 10/2009 | Takamine | ........... H04L 12/1822 358/482 |
| 10,349,211 | B1 | 7/2019 | Do | |
| 11,109,319 | B2 * | 8/2021 | Xu | ..................... H04W 52/0245 |
| 11,522,597 | B2 * | 12/2022 | Gao | ..................... H04B 7/0632 |
| 2012/0026971 | A1 * | 2/2012 | Khandelia | ........... H04W 36/005 370/331 |
| 2013/0339439 | A1 * | 12/2013 | Deng | ..................... H04L 67/52 709/204 |
| 2015/0172858 | A1 * | 6/2015 | Choi | ..................... G01S 19/14 455/456.1 |

(Continued)

OTHER PUBLICATIONS

Amendments received before examination dated Jul. 6, 2024 for EP 21908855. (Year: 2024).*

(Continued)

*Primary Examiner* — Juan A Torres

(57) ABSTRACT

In an information sharing method, a communication apparatus obtains first information sharing level of a first device, and sends first shared information corresponding to the first information sharing level to a second device. The apparatus obtains a second information sharing level of the first device, and sends second shared information corresponding to the second information sharing level to the second device. The second information sharing level is different from the first information sharing level, the second shared information is not exactly the same as the first shared information, and the first shared information and the second shared information are for model training.

17 Claims, 8 Drawing Sheets

(56)          References Cited

U.S. PATENT DOCUMENTS

2017/0208437 A1\*  7/2017  Yokoyama ............. G06Q 10/10
2020/0008009 A1\*  1/2020  Do ........................ G01S 5/0072

OTHER PUBLICATIONS

Amended claims filed after receipt of (European) search report dated Jul. 16, 2024 for EP 21908855. (Year: 2024).\*
European search opinion dated Mar. 19, 2024 for EP 21908855. (Year: 2024).\*

\* cited by examiner

Third
device

Device
group

First
device

Second
device

Second
device

Second
device

| Shared information 1 | Shared information 2 | Shared information 3 |
|---|---|---|

Shared information range 1
corresponding to an
information sharing level 1

Shared information range 2
corresponding to an
information sharing level 2

Shared information range 3
corresponding to an
information sharing level 3

FIG. 2

| Shared information 1 | Shared information 2 | Shared information 3 |
|---|---|---|

Shared information
range 1
corresponding to an
information sharing
level 1

Shared information
range 2 corresponding
to an information
sharing level 2

Shared information range 3
corresponding to an
information sharing level 3

FIG. 3

INFORMATION SHARING METHOD AND COMMUNICATION DEVICE

CROSS-REFERENCE TO RELATED APPLICATION

This application is a continuation of International Application PCT/CN2021/127298, filed on Oct. 29, 2021, which claims priority to Chinese Patent Application 202011553076.9, filed on Dec. 24, 2020. The disclosures of the aforementioned priority applications are hereby incorporated by reference in their entirety.

TECHNICAL FIELD

This application relates to the field of communication technologies, and in particular to an information sharing method and a communication apparatus.

BACKGROUND

In some application scenarios, devices in a device group may share respective information with each other, so that each device separately performs machine learning based on information received from another device and information of the device, to obtain a trained model, and outputs a decision based on the model. The decision causes performance of the device to change. An objective of model training is to optimize overall performance of the device group.

There is no good way to determine an amount of shared information between devices to optimize the overall performance of the device group.

SUMMARY

This application provides a communication method and a communication apparatus, to optimize overall performance of a device group.

According to a first aspect, an embodiment of this application provides a communication method. The method may be performed by a first device, or may be performed by a component (for example, a processor, a chip, or a chip system) of the first device. The method includes: obtaining a first information sharing level of the first device; sending, to at least one second device, first shared information corresponding to the first information sharing level; obtaining a second information sharing level of the first device; and sending, to the at least one second device, second shared information corresponding to the second information sharing level. The second information sharing level is different from the first information sharing level, the second shared information is not exactly the same as the first shared information, and the first shared information and the second shared information are used for model training.

According to this solution, the first device may send shared information to another device in the device group based on an information sharing level, and the information sharing level may change dynamically, so that an amount of the shared information may also change dynamically. This enables devices in the device group to dynamically adjust the amount of the shared information, thereby continuously optimizing overall performance of the device group, and achieving an objective that overall performance of the device group is optimized.

In a possible implementation method, indication information is sent to a third device, where the indication information indicates at least two information sharing levels, and the at least two information sharing levels include the first information sharing level. The obtaining a first information sharing level of a first device includes: obtaining the first information sharing level from the third device.

According to this solution, a division manner of the information sharing level is provided for the third device, and then the third device selects an information sharing level for the first device. In the method, the third device selects an information sharing level for the first device, so that power consumption of the first device can be reduced.

In a possible implementation method, the indication information further indicates shared information ranges respectively corresponding to the at least two information sharing levels.

According to this solution, the third device is provided with the shared information ranges respectively corresponding to the information sharing levels, so that the third device can select the information sharing level more accurately.

In a possible implementation method, the first shared information is a portion of the second shared information. Alternatively, the second shared information is a portion of the first shared information.

According to the solution, the shared information corresponding to different information sharing levels has a containing and contained relationship. Therefore, the shared information has a trend of gradually increasing or decreasing, and an amount of shared information can be accurately controlled.

In a possible implementation method, third shared information is separately received from the at least one second device, and the third shared information is used for model training. Performance information is determined based on the third shared information. The performance information is sent to the third device, where the performance information is used for determination of the information sharing level. The obtaining a second information sharing level of the first device includes: obtaining the second shared information level from the third device.

According to this solution, the first device may determine the performance information based on the received shared information, and provide the performance information to the third device, so that the third device can re-determine an information sharing level for the first device based on the performance information, thereby implementing dynamic adjustment of the information sharing level and optimizing performance of the first device and overall performance of the device group.

In a possible implementation method, the first information sharing level includes one or more of the following:

a spectral efficiency sharing level, where the spectral efficiency sharing level is non-shared spectral efficiency or shared spectral efficiency;

a channel state sharing level, where the channel state sharing level is non-shared channel state information or shared channel state information;

a parameter sharing level, where the parameter sharing level is a non-shared parameter or a shared parameter; and a location sharing level, where the location sharing level is non-shared location information or shared location information.

A parameter in the parameter sharing level include, for example, a decision parameter.

The decision refers to selection, allocation, setting, or the like performed by a communication device in a communication process.

A decision parameter includes the decision and other parameter that may affect the decision.

For example, the communication device (for example, the first device) selects a modulation and coding scheme (modulation and coding scheme, MCS), and the decision parameter may be the selected MCS. The communication device performs power allocation, and the decision parameter may be a result of the power allocation. The communication device sets a precoding matrix, and the decision parameter may be the precoding matrix.

The parameter that may affect the decision includes settings of parameters such as a physical layer and a medium access control (medium access control, MAC) layer that are of the communication device. For example, when the communication device chooses whether to perform a switch, the decision is affected by parameters such as a measurement report and an A2 event threshold. In this case, the measurement report and the A2 event threshold are decision parameters.

The parameter that may affect the decision further includes an algorithm parameter for outputting the decision. For example, the measurement report is input into a neural network, and an output of the neural network is used as a basis for selecting whether to switch. In this case, the decision parameter may be a parameter of the neural network. The parameter of the neural network may include a structure parameter, a weight parameter, and a bias parameter of the neural network.

According to this solution, the information sharing level can be finely classified, so that shared information content can be accurately controlled, thereby optimizing the overall performance of the equipment group.

According to a second aspect, an embodiment of this application provides a communication method. The method may be performed by a third device, or may be performed by a component (such as a processor, a chip, or a chip system) of the third device. The method includes: obtaining first performance information of a first device and second performance information of a second device; determining a third information sharing level based on the first performance information and the second performance information; and sending first indication information to the first device, where the first indication information indicates the third information sharing level. The third information sharing level is used for information sharing between the first device and the second device.

According to this solution, the third device determines an information sharing level for the first device, and the first device may send shared information to another device in the device group based on the information sharing level. The third device may determine an optimal information sharing level for each device in the device group, so that the devices in the device group can perform information sharing based on the optimal information sharing level, thereby continuously optimizing overall performance of the device group, and achieving an objective that overall performance of the device group is optimized.

In a possible implementation method, a fourth information sharing level is determined based on the first performance information and the second performance information, where the fourth information sharing level is used for information sharing between the first device and the second device. Second indication information is sent to the second device, where the second indication information indicates the fourth information sharing level.

According to this solution, the third device determines the information sharing level for the second device, and the second device may send the shared information to another device in the device group based on the information sharing level. The third device may determine an optimal information sharing level for each device in the device group, so that the devices in the device group can perform information sharing based on the optimal information sharing level, thereby continuously optimizing overall performance of the device group, and achieving an objective that overall performance of the device group is optimized.

In a possible implementation method, the determining a third information sharing level based on the first performance information and the second performance information includes: determining gain efficiency based on the first performance information and the second performance information, where the gain efficiency meets a first condition; and determining the third information sharing level based on the preset step.

According to this solution, the gain efficiency is used as a reference index to determine the information sharing level and this is helpful to accurately determine the information sharing level.

In a possible implementation method, the first condition is: The gain efficiency change amount corresponding to the gain efficiency is greater than a first threshold.

According to this solution, when the gain efficiency change amount corresponding to the gain efficiency is greater than the first threshold, it indicates that performance of the device is significantly improved. Therefore, the information sharing level may continue to be updated, to further improve the performance of the device.

In a possible implementation method, the determining the third information sharing level based on a preset step includes: adding the preset step to the information sharing level of the first device, to obtain the third information sharing level; or decreasing the preset step size from the information sharing level of the first device, to obtain the third information sharing level.

According to this solution, the information sharing level is updated through the preset step, and this is easy to implement, and helps quickly determine a proper information sharing level.

In a possible implementation method, the determining a third information sharing level based on the first performance information and the second performance information includes: determining interference information based on the first performance information and the second performance information; and determining the third information sharing level based on the interference information.

According to this solution, the information sharing level is determined by determining the interference information, and this helps to accurately determine a proper information sharing level.

In a possible implementation method, the first performance information indicates a signal to interference plus noise ratio and/or co-channel signal interference strength, and the second performance information indicates a signal to interference plus noise ratio and/or co-channel signal interference strength.

According to this solution, the performance information of the device is represented by a signal to interference plus noise ratio and/or co-channel signal interference strength, so that the performance information of the device can be accurately represented, and the third device is helped to accurately determine a proper information sharing level.

In a possible implementation method, the determining a third information sharing level based on the first performance information and the second performance information includes: determining an information importance indication based on the first performance information and the second performance information; and determining the third information sharing level according to the information importance indication.

According to this solution, the information sharing level is determined by determining the information importance indication, and this helps to accurately determine a proper information sharing level.

In a possible implementation method, the determining a third information sharing level based on the first performance information and the second performance information includes: determining an environment change indication based on the first performance information and the second performance information; and determining the third information sharing level according to the environment change indication.

According to this solution, the information sharing level is determined by determining the environment change indication, and this helps to accurately determine a proper information sharing level.

According to a third aspect, an embodiment of this application provides a communication apparatus. The apparatus may be a first device, or may be a chip configured for the first device. The apparatus has a function of implementing the first aspect or each possible implementation method according to the first aspect. The function may be implemented by hardware, or may be implemented by hardware executing corresponding software. The hardware or the software includes one or more modules corresponding to the function.

According to a fourth aspect, an embodiment of this application provides a communication apparatus. The apparatus may be a second device or a third device, or may be a chip configured for the second device or a chip configured for the third device. The apparatus has a function of implementing the second aspect or each possible implementation method according to the second aspect. The function may be implemented by hardware, or may be implemented by hardware executing corresponding software. The hardware or the software includes one or more modules corresponding to the function.

According to a fifth aspect, an embodiment of this application provides a communication apparatus, including a processor, where the processor is coupled to a memory, the memory is configured to store a program or an instruction. When the program or the instruction is executed by the processor, the apparatus implements the method according to the first aspect, each possible implementation method according to the first aspect, the method according to the second aspect, or each possible implementation method according to the second aspect. The memory may be located inside or outside the apparatus. There are one or more processors.

According to a sixth aspect, an embodiment of this application provides a communication apparatus, including a unit or means (means) configured to perform each step of the method according to the first aspect, each possible implementation method according to the first aspect, the method according to the second aspect, or each possible implementation method according to the second aspect.

According to a seventh aspect, an embodiment of this application provides a communication apparatus, including a processor and an interface. The processor is configured to control an interface to communicate with another apparatus, and perform the method according to the first aspect, each possible implementation method according to the first aspect, the method according to the second aspect, or each possible implementation method according to the second aspect. There are one or more processors.

According to an eighth aspect, an embodiment of this application further provides a computer-readable storage medium, including an instruction. When the instruction runs on a computer, so that the computer performs the method in the first aspect, each possible implementation method according to the first aspect, the method in the second aspect, or each possible implementation method according to the second aspect.

According to a ninth aspect, an embodiment of this application further provides a computer program product. When the computer program product runs on a computer, the computer is enabled to perform the method according to the first aspect, each possible implementation method according to the first aspect, the method according to the second aspect, or each possible implementation method according to the second aspect.

According to a tenth aspect, an embodiment of this application further provides a chip system, including a processor, where the processor is coupled to a memory, and the memory is configured to store a program or an instruction. When the program or the instruction is executed by the processor, the chip system implements the method according to the first aspect, each possible implementation method according to the first aspect, the method according to the second aspect, or each possible implementation method according to the second aspect. The memory may be located in the chip system, or may be located outside the chip system. There are one or more processors.

BRIEF DESCRIPTION OF DRAWINGS

FIG. 1($b$) is an example diagram of an application scenario to which an embodiment of this application is applicable;

FIG. 2 is an example diagram of a shared information range;

FIG. 3 is another example diagram of a shared information range;

DESCRIPTION OF EMBODIMENTS

Figures 1A, 1B:
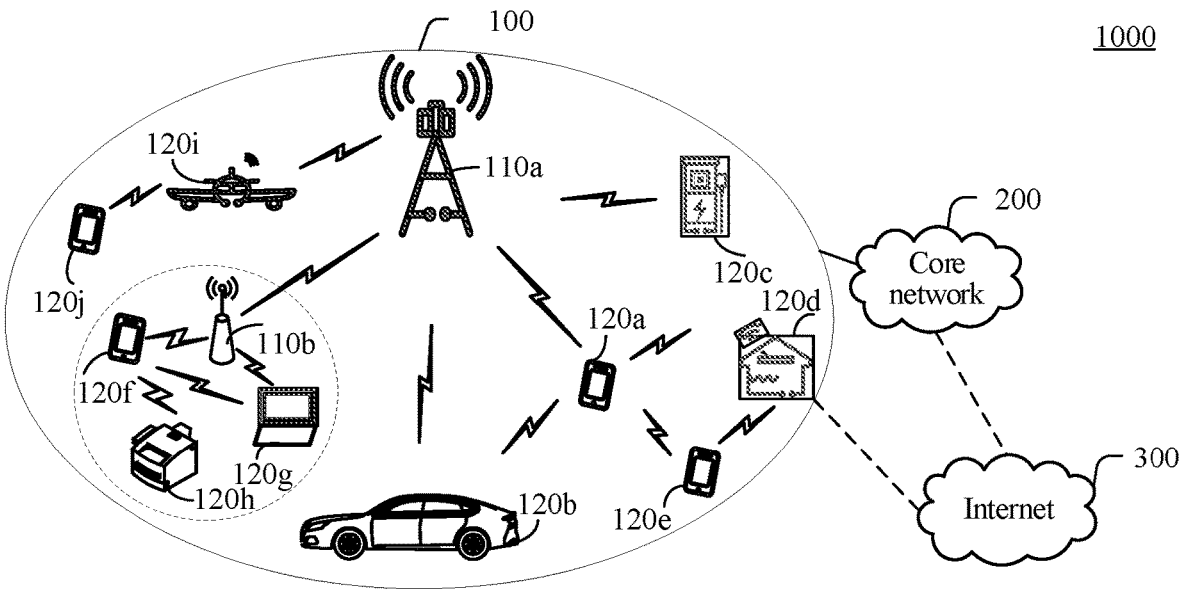
FIG. 1($a$) is a schematic diagram of an architecture of a mobile communication system to which an embodiment of this application is applied.

FIG. 1($a$) is a schematic diagram of an architecture of a communication system 1000 to which an embodiment of this application is applied. As shown in FIG. 1(*a*), the communication system includes a radio access network 100 and a core network 200. Optionally, the communication system 1000 may further include the Internet 300. The radio access network 100 includes a network node. The network node may include at least one radio access network device (for example, 110*a* and 110*b* in FIG. 1(*a*)), and may further include at least one terminal (for example, 120*a* to 120*j* in FIG. 1(*a*)). The terminal is connected to a radio access network device in a wireless manner, and the radio access network device is connected to a core network in a wireless or wired manner. A core network device and the radio access network device may be independent and different physical devices, or functions of the core network device and logical functions of the radio access network device are integrated into a same physical device, or a part of functions of the core network device and a part of functions of the radio access network device are integrated into one physical device. A wired or wireless manner may be used for connection between terminals and between radio access network devices. FIG. 1(*a*) is only a schematic diagram. The communication system may further include another network device, for example, a wireless relay device and a wireless backhaul device, which are not shown in FIG. 1(*a*).

The radio access network device may be a base station (base station), an evolved NodeB (evolved NodeB, eNodeB), a transmission reception point (transmission reception point, TRP), or a 5th generation (5th generation, 5G) a next generation NodeB (next generation NodeB, gNB) in a mobile communication system, a next generation NodeB in a sixth generation (6th generation, 6G) mobile communication system, a base station in a future mobile communication system, an access node in a Wi-Fi system, or the like; or may be a module or unit that implements some functions of the base station, for example, a central unit (central unit, CU), or a distributed unit (distributed unit, DU). The radio access network device may be a macro base station (for example, 110*a* in FIG. 1(*a*)), or may be a micro base station or an indoor station (for example, 110*b* in FIG. 1(*a*)), or may be a relay node, a donor node, or the like. A specific technology and a specific device form used by the radio access network device are not limited in an embodiment of this application. For ease of description, the following uses an example in which the base station is used as the radio access network device for description.

The terminal may also be referred to as a terminal device, user equipment (user equipment, UE), a mobile station, a mobile terminal, or the like. The terminal may be widely used in various scenarios, for example, device-to-device (device-to-device, D2D), vehicle to everything (vehicle to everything, V2X) communication, machine-type communication (machine-type communication, MTC), and the Internet of things (Internet of things, IoT), virtual reality, augmented reality, industrial control, autonomous driving, telemedicine, smart grid, smart furniture, smart office, smart wearable, intelligent traffic, smart city, or the like. The terminal may be a mobile phone, a tablet computer, a computer with a wireless sending and receiving function, a wearable device, a vehicle, an uncrewed aerial vehicle, a helicopter, an airplane, a ship, a robot, a robotic arm, a smart home device, or the like. A specific technology and a specific device form used by the terminal are not limited in an embodiment of this application.

The core network device in an embodiment of this application may be, for example, a mobility management entity (mobility management entity, MME), a serving gateway (serving gateway, S-GW), a packet data network gateway (packet data network gateway, PDN-GW), or the like in Long Term Evolution (long term evolution, LTE), or may be an access and mobility management function (access and mobility management function, AMF) network element or a session management function (session management function, SMF), an SMF network element, a user plane function (user plane function, UPF) network element, or the like in 5G, or may be a core network element in a 6G or future mobile communication system.

The base station and the terminal may be fixed or movable. The base station and the terminal may be deployed on land, including indoor or outdoor, handheld or vehicle-mounted; the base station and the terminal may also be deployed on water surface; and the base station and the terminal may also be deployed on an airplane, an uncrewed aerial vehicle, a balloon or a satellite in the air. Application scenarios of the base station and the terminal are not limited in an embodiments of this application.

A role of the base station and the terminal may be relative. For example, a helicopter or an uncrewed aerial vehicle 120*i* in FIG. 1(*a*) may be configured as a mobile base station. For a terminal 120*j* accessing a radio access network 100 through 120*i*, the terminal 120*i* is abase station. However, for a base station 110*a*, 120*i* is a terminal, in other words, communication between 110*a* and 120*i* is performed over a wireless air interface protocol. Certainly, communication may also be performed between 110*a* and 120*i* over an interface protocol between base stations. In this case, for 110*a*, 120*i* is also a base station. Therefore, both the base station and the terminal may be collectively referred to as a communication apparatus, 110*a* and 110*b* in FIG. 1(*a*) may be referred to as a communication apparatus having a base station function, and 120*a* to 120*j* in FIG. 1(*a*) may be referred to as a communication apparatus having a terminal function.

Communication between a base station and a terminal, between a base station and a base station, or between a terminal and a terminal may be performed by a licensed spectrum, or may be performed by an unlicensed spectrum, or may be performed by both a licensed spectrum and an unlicensed spectrum. Communication may be performed by a spectrum below 6 gigahertz (gigahertz, GHz), or may be performed by a spectrum above 6 GHz, or may be performed by both a spectrum below 6 GHz and a spectrum above 6 GHz. A spectrum resource used for wireless communication is not limited in an embodiment of this application.

In embodiments of this application, a function of the base station may be performed by a module (such as a chip) in the base station, or may be performed by a control subsystem including a base station function. A control subsystem that includes a base station function herein may be a control center in an application scenario of the foregoing terminal, such as a smart grid, an industrial control, an intelligent traffic, and a smart city. A function of the terminal may alternatively be performed by a module (such as a chip or a modem) in the terminal, or may be performed by an apparatus including the function of the terminal.

In this application, the base station sends a downlink signal or downlink information to the terminal, where the downlink information is carried on a downlink channel. The terminal sends an uplink signal or uplink information to the base station, where the uplink information is carried on an uplink channel. The terminal sends a sidelink (sidelink) signal or sidelink information to the terminal, where the sidelink information is carried on a sidelink channel. A sidelink may also be referred to as a side-link, a side link, a sidelink, or the like.

In an embodiment of this application, one device group includes at least two devices, and devices may communicate directly or indirectly with each other. A Communication manner may be wireless communication or wired communication. The devices in the device group may be devices of a same type, for example, all are terminals, or all are radio access network devices. The devices in the device group can also be of different types. Refer to FIG. 1(b). FIG. 1(b) is an example diagram of an application scenario to which an embodiment of this application is applicable. In this example, one device group includes four devices, which are respectively one first device and three second devices. Certainly, in an actual application, a quantity of devices in a device group is not limited to 4, or may further be 2, 3, 5, or the like.

It should be noted that, in the example shown in FIG. 1(b), any two devices in the device group may be directly connected. In another implementation, some devices in the device group may not be directly connected to each other. Therefore, if two devices that are not directly connected need to communicate, communication information may be forwarded by another device in the device group or a device (for example, a third device) outside the device group.

A device in the device group may send shared information to another device in the device group and/or receive the shared information from another device in the device group. The device in the device group may perform model training based on information of the device and the shared information received from another device to obtain a trained model, and output a decision based on the model. The decision may cause a change in communication performance of the device. For example, if some devices in the device group skip performing model training (for example, because the devices lack a computing capability), the devices may send the shared information to another device, but do not receive the shared information from another device. For another example, some devices in the device group need to perform model training but do not want to send the shared information externally. In this case, the devices may receive the shared information from another device, but do not send the shared information to another device. For another example, some devices in the device group need to perform model training and want to send the shared information to the outside. In this case, the devices may receive the shared information from another device, and may send the shared information to another device.

Optionally, the device group is corresponding to the third device, and the third device is configured to adjust an information sharing level of the device in the device group.

In an implementation method, the third device may be a device outside the device group.

In another implementation method, the third device may alternatively be a device in the device group, in other words, the third device and a device in the device group are a same device. FIG. 1(b) is used as an example. For example, the third device and the first device are a same device, or the third device and a second device in the device group are a same device.

In this embodiment of this application, when the third device is a device in a device group or a function module of a device, each device in the device group may be a terminal, a radio access network device, a core network device, or the like.

In this embodiment of this application, when the third device is a device outside the device group, each device in the device group may be the terminal and the third device is the radio access network device, or each device in the device group may be the access network device and the third device is the core network device. Alternatively, each device in the device group may be the core network device, and the third device may be a network management device, or the like.

In an implementation method, one device group may also include a plurality of device subgroups. Therefore, in this embodiment of this application, one device group may include the plurality of device subgroups, or include a plurality of devices, or include at least one device subgroup and at least one device.

In this embodiment of this application, devices may be grouped according to the following method, to form one or more device groups.

Method 1: Devices using a value network form a device group.

The value network (critic network or value network) is structured by a neural network, and is usually used for reinforcement learning training together with a policy network (policy network) in a reinforcement learning algorithm. An input of the value network is local information and shared information, and an output of the value network is estimation of overall performance of the device group or performance of the devices.

Method 2: Devices that are geographically close to each other form a device group.

For example, a geographical area is defined, and devices in the area form a device group.

Method 3: Devices with similar surroundings form a device group.

For example, indoor micro base stations with similar office layouts form a device group, and similar environments make it easier for the indoor micro base station to obtain a better information sharing level.

Method 4: Devices in a competitive relationship form a device group.

The competition relationship may mean that overlapping coverage area between the devices is included, co-channel interference between the devices is included, performance improvement of one device may cause performance deterioration of another device, or the like.

To determine an amount of the shared information between the devices, thereby optimizing overall performance of the device group, in an embodiment of this application, the devices in the device group send the shared information to another device in the device group based on respective information sharing levels of the devices, and the information sharing levels of the devices in the device group may be kept synchronous and may also be out of synchronization. "Synchronous" means that the information sharing levels of the devices in the device group are the same. "Out of synchronization" means that the information sharing levels of the devices in the device group are not exactly the same.

The information sharing level is used to indicate a range of the shared information and/or time for sending the shared information. The time for sending the shared information may be a frequency of sending the shared information. When the information sharing level is used to indicate the range of the shared information and the time for sending the shared information, a product of an information range of a single sharing and a frequency of sending the shared information may be used to indicate the amount of the shared information.

Each device in the device group may separately define the information sharing level and a shared information range corresponding to the information sharing level. Therefore, the information sharing levels of each device may not be exactly the same, and shared information ranges corresponding to the information sharing levels of each device may not be exactly the same. Alternatively, the devices in the device group define the information sharing level and the shared information range corresponding to the information sharing level in a same manner, so that the information sharing levels of the devices are the same, and the shared information ranges corresponding to the information sharing levels of the devices are also the same.

For example, an information sharing level of a device in the device group and a shared information range corresponding to the information sharing level are shown as follows:

information sharing level 1 and shared information range 1;

information sharing level 2 and shared information range 2;

. . .

information sharing level N, and shared information range N.

N is a positive integer.

In an implementation method, as the information sharing level increases, the shared information range gradually increases, and a shared information range corresponding to a high-level information sharing level covers a shared information range corresponding to a low-level information sharing level. Refer to FIG. 2. An example diagram of a shared information range is shown. In this example, a relationship between an information sharing level, the shared information range, and the shared information of a device is as follows:

information sharing level 1: shared information range 1 (shared information 1)

information sharing level 2: shared information range 2 (shared information 1+shared information 2)

information sharing level 3: shared information range 3 (shared information 1+shared information 2+shared information 3).

The shared information 1, the shared information 2, and the shared information 3 have no intersection with each other.

In another implementation method, as the information sharing level increases, the shared information range does not significantly increase or decrease correspondingly. In other words, it should be understood that a significant containing and contained relationship between the shared information ranges corresponding to the different information sharing levels is not included. In other words, a containing and contained relationship between the shared information ranges corresponding to the different information sharing levels may be included, or the containing and contained relationship between the shared information ranges corresponding to the different information sharing levels may not be included. Refer to FIG. 3. Another example diagram of a shared information range is shown. In this example, a relationship between an information sharing level, the shared information range, and shared information of a device is as follows:

Information sharing level 1: Shared information range 1 (shared information 1)

Information sharing level 2: Shared information range 2 (shared information 2)

Information sharing level 3: Shared information range 3 (a portion of the shared information 2+shared information 3).

The shared information 1, the shared information 2, and the shared information 3 have no intersection with each other.

Each device in the device group may separately define the information sharing level and the time for sending shared information corresponding to the information sharing level, or each device in the device group may define the information sharing level and the time for sending shared information corresponding to the information sharing level in a same manner.

In an implementation method, a correspondence between the information sharing level of the device and the time for sending the shared information is included. For example, a relationship between the information sharing level of the device and the time for sending the shared information (for example, the time can indicate a frequency at which the shared information is sent) is as follows:

information sharing level 1: time 1 for sending shared information (once every 1000 ms)

information sharing level 2: time 2 for sending shared information (once every 100 ms);

information sharing level 3: time 3 for sending shared information (once every 10 milliseconds).

In an implementation method, when all devices in the device group are radio access network devices, the information sharing level may be further determined based on a type of a radio access network device connected to the access network device. For example, if both a macro base station and a micro base station exist in the device group, the information sharing level may be set for the devices in the device group based on the following example in Table 1.

TABLE 1

| Type of a radio access network | Information sharing level | | | |
|---|---|---|---|---|
| device | level 1 | level 2 | level 3 | level 4 |
| Macro base station –> macro base station | ✓ | | | |
| Macro base station –> micro base station | | ✓ | | |
| Micro base station –> Micro base station | | | ✓ | |
| Micro base station –> macro base station | | | | ✓ |

Refer to Table 1. For example, the macro base station in the device group sends the shared information to another macro base station in the device group based on the information sharing level 1, and sends the shared information to the micro base station in the device group based on the information sharing level 2. The micro base station in the device group sends the shared information to another micro base station in the device group based on the information sharing level 3, and sends the shared information to the macro base station in the device group based on the information sharing level 4.

In an implementation method, in an embodiment of this application, the information sharing level (for example, the first information sharing level, the second information sharing level, the third information sharing level, and the fourth information sharing level in this application) may be fine classified. For example, the information sharing level is classified into one or more of the following:

(1) a spectral efficiency sharing level: including non-shared spectral efficiency (level 1) and shared spectral efficiency (level 2).

(2) a channel state sharing level: including non-shared channel state information (level 1) and shared channel state information (level 2);

(3) a parameter sharing level: including a non-shared parameter (level 1) and a shared parameter (level 2);

A parameter in the parameter sharing level include, for example, a decision parameter.

A decision parameter includes the decision and other parameter that may affect the decision.

For example, a communication device (for example, the first device and the second device) selects a modulation and coding scheme (modulation and coding scheme, MCS), and the decision parameter may be the selected MCS. The communication device performs power allocation, and the decision parameter may be a result of the power allocation. The communication device sets a precoding matrix, and the decision parameter may be the precoding matrix.

The parameter that may affect the decision includes settings of parameters such as a physical layer and a medium access control (MAC) layer that are of the communication device. For example, when the communication device chooses whether to perform a switch, the decision is affected by parameters such as a measurement report and an A2 event threshold. In this case, the measurement report and the A2 event threshold are decision parameters.

The parameter that may affect the decision further includes an algorithm parameter for outputting the decision. For example, the measurement report is input into a neural network, and an output of the neural network is used as a basis for selecting whether to switch. In this case, the decision parameter may be a parameter of the neural network. The parameter of the neural network may include a structure parameter, a weight parameter, and a bias parameter of the neural network.

(4) Location sharing level: including non-shared location information (level 1) and shared location information (level 2);

(5) Throughput sharing level: including non-shared throughput information (level 1) and shared throughput information (level 2);

(6) Quality of service sharing level: including non-shared quality of service information (first level) and shared quality of service information (second level);

(7) Packet error rate sharing level: including non-shared packet error rate information (level 1) and shared packet error rate information (level 2);

(8) Power allocation parameter sharing level: including non-shared power allocation parameter information (level 1) and shared power allocation parameter information (level 2);

(9) Neural network parameter sharing level: including non-shared neural network parameter information (level 1) and shared neural network parameter information (level 2);

(10) Signal to interference plus noise ratio sharing level: including non-shared signal to interference plus noise ratio information (level 1) and shared signal to interference plus noise ratio information (level 2);

(11) Modulation and coding scheme (MCS) parameter sharing level: including non-shared modulation and coding scheme (MCS) parameter information (level 1) and shared modulation and coding scheme (MCS) parameter information (level 2);

(12) Beam selection parameter sharing level: including non-shared beam selection parameter information (level 1) and shared beam selection parameter information (level 2).

The information sharing level may be any combination of the foregoing finely classified information sharing levels, for example:

An information sharing level is defined as a spectral efficiency sharing level 1 and a location sharing level 2, in other words, spectral efficiency information is not shared, but location information is shared.

In an implementation method, in an embodiment of this application, the information sharing level may be classified based on a type of a communication task. Refer to Table 2. Table 2 is an example of an information sharing level classification manner.

TABLE 2

| Communica-tion Task | Information Sharing Level | | | |
| --- | --- | --- | --- | --- |
| | Level 1 | Level 2 | Level 3 | Level 4 |
| Power Allocation | Not share | Share a terminal location. | Share the terminal location and a power allocation policy. | Share the terminal location, the power allocation policy, and a throughput. |
| Beam Interference Suppression | Not share | Share a beam direction. | Share the beam direction and a beamforming policy. | Share the beam direction and the beamforming policy, and the throughput. |
| Multiple Reflective Surface Adjustment | Not share | Share a Codebook of reflective surface. | Share the Codebook of reflective surface and an adjustment strategy. | Share the Codebook of reflective surface and the adjustment strategy, and a throughput in a coverage area. |

Refer to Table 2. Different classification manners of different information sharing levels may be determined according to different communication tasks.

For example, for a power allocation task, the information sharing level is classified into level 1: none, level 2: share the terminal location; level 3: share the terminal location and the power allocation policy; level 4: share the terminal location, the power allocation policy, and the throughput. For another example, for a beam interference suppression task, an information sharing level is classified into level 1: none, level 2: share the beam direction; level 3: share the beam direction and the beamforming policy; level 4: share the beam direction, the beamforming policy, and the throughput. For another example, for a multiple reflective surface adjustment task, an information sharing level is classified into level 1: none, level 2: share the codebook of reflective surface; level 3: share the codebook of reflective surface and the adjustment policy; level 4: share the codebook of reflective surface, the adjustment strategy, and the throughput in the coverage area.

It can be learned from the example in Table 2 that, as the information sharing levels increase, the shared information may gradually increase, and shared information corresponding to a higher information sharing level may include shared information corresponding to a lower information sharing level.

Figure 4:
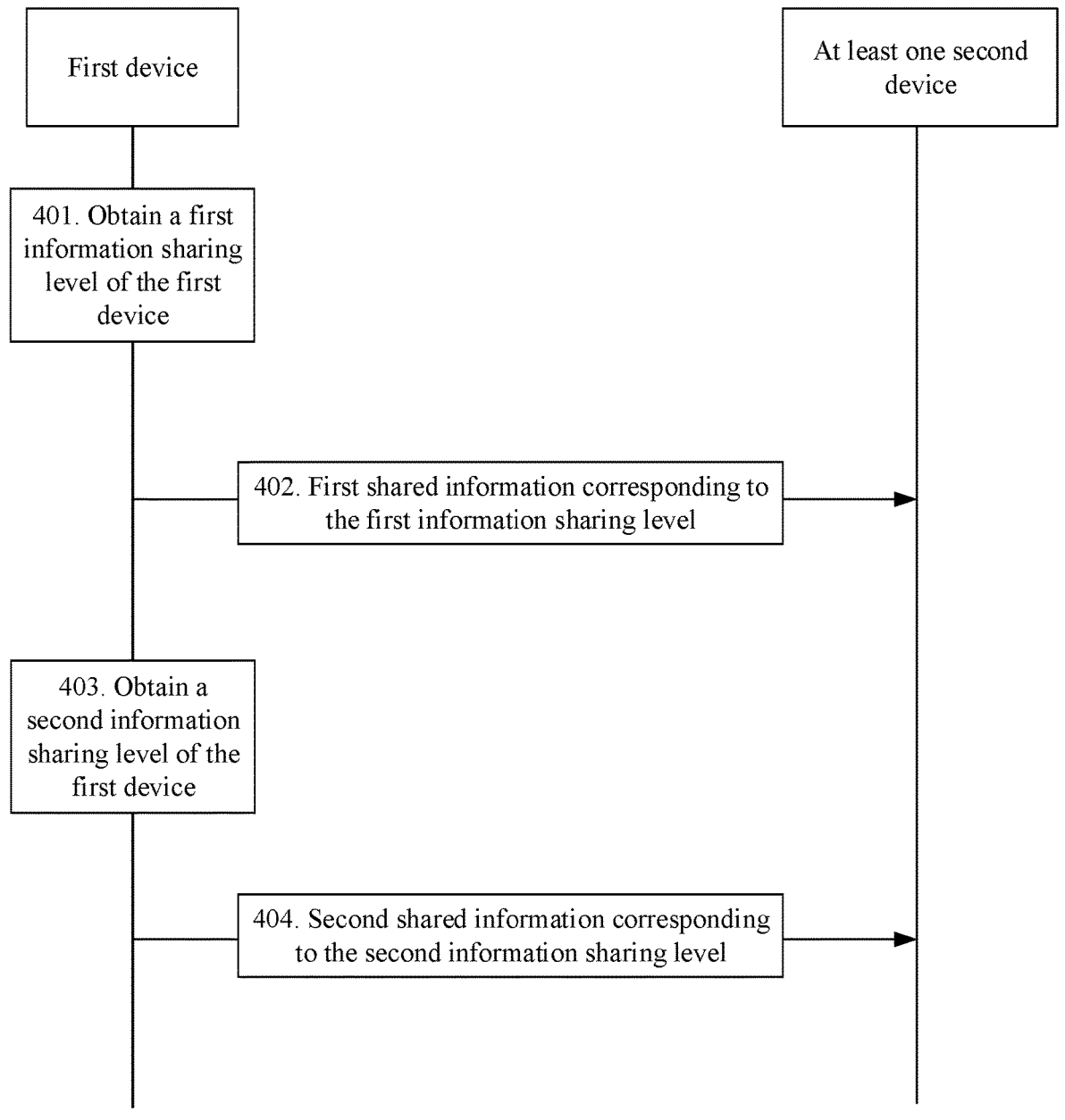
FIG. 4 is a schematic diagram of a communication method according to an embodiment of this application.

Refer to FIG. 4. FIG. 4 is a schematic diagram of a communication method according to an embodiment of this application. The method may be performed by a device in a device group or a chip configured for a device. For ease of description, the following uses an example in which a first device and at least one second device in the example in FIG. 1(b) perform the communication method.

The method includes the following steps.

Step 401: The first device obtains a first information sharing level of the first device.

Step 402: The first device sends, to the at least one second device, first shared information corresponding to the first information sharing level.

In an implementation method, the first device may actively send the first shared information to the second device. In another implementation method, the second device requests to obtain the first shared information from the first device, and then the first device sends the first shared information to the second device.

In an implementation method, the first device may send the first shared information to the second device through an interface between the first device and the second device. In another implementation method, the first device may also send the first shared information to an intermediate device (for example, a third device), and the intermediate device forwards the first shared information to the second device.

Optionally, the first shared information sent by the first device may be carried in downlink control information (downlink control information, DCI), a radio resource control (radio resource control, RRC) message, a medium access control control element (medium access control control element, MAC CE), or the like.

According to the method, the first device may send, to another device in the device group, based on the information sharing level, shared information used for model training, so that another device in the device group may perform model training based on the received shared information to obtain a trained model, and output a decision based on the model. The decision may cause communication performance of another device to change, to achieve an objective that performance of the device in the device group is optimized.

Optionally, the method may further include the following steps.

Step 403: The first device obtains a second information sharing level of the first device.

Step 404: The first device sends, to the at least one second device, second shared information corresponding to the second information sharing level.

An implementation method in which the first device sends the second shared information to the second device is similar to an implementation method in which the first device sends the first shared information to the second device. For details, refer to the foregoing description.

The second information sharing level is different from the first information sharing level, the second shared information is not exactly the same as the first shared information. The first shared information and the second shared information are used for model training.

Optionally, the first shared information is a portion of the second shared information, or the second shared information is a portion of the first shared information.

According to this solution, the first device may send the shared information to another device in the device group based on the information sharing level, and the information sharing level may be dynamically changed, so that an amount of the shared information (For example, the amount of the shared information may be calculated by a range of sending the information at a time and a frequency at which the shared information is sent.) may be dynamically changed. Therefore, the devices in the device group can dynamically adjust the amount of the shared information can, to continuously optimize overall performance of the device group, and achieve an objective that overall performance of the device group is optimized.

In an implementation method, an initial information sharing level may be preconfigured for the first device. When sharing information with another device for the first time, the first device may share information based on the initial information sharing level. For example, in step 401, the first device may obtain the initial information sharing level (for example, the first information sharing level). For example, the initial information sharing level is an information sharing level 0, and the information sharing level 0 indicates that information is not shared.

In another implementation method, an initial information sharing level may not be preconfigured for the first device, and the first device may obtain the information sharing level from another device such as a third device. For example, the first device obtains the first information sharing level and the second information sharing level from the third device. The third device herein is a device different from the first device. Optionally, before step 401, the first device may further send indication information to the third device. The indication information indicates at least two information sharing levels, and the at least two information sharing levels include the first information sharing level. In other words, the first device reports, to the third device, a classification manner of the information sharing level of the first device, and the third device determines the first information sharing level for the first device. Optionally, the indication information further indicates information sharing ranges respectively corresponding to the at least two information sharing levels of the first device. For example, a relationship between the information sharing level and the information sharing range may be shown in FIG. 2 or FIG. 3.

The first device may not only send the shared information of the first device to another device in the device group, for example, the second device, but also receive the shared information of another device from another device. FIG. 1(*b*) is used as an example. The first device may separately receive third shared information from the at least one second device, and the first device performs model training based on information of the first device (including but not limited to one or more of spectral efficiency, channel state information, location information, a decision parameter, throughput information, quality of service information, packet error rate information, power allocation parameter information, neural network parameter information, signal to interference plus noise ratio information, modulation and coding scheme parameter information, and beam selection parameter information) and the third shared information received from one or more second devices, to obtain a trained model. Then the first device outputs a decision based on the model, and the decision causes a change in communication performance of the device, and therefore performance information of the first device may be obtained. The first device sends the performance information to the third device, and the third device re-determines the information sharing level of each device in the device group based on the performance information received from the first device and the performance information received from some or all devices in the device group except the first device. For example, if the third device re-determines that the information sharing level of the first device is the second information sharing level, the third device sends, to the first device, indication information used to indicate the second information sharing level. Therefore, the first device may update the first information sharing level to the second information sharing level. In other words, in step 403, the first device may obtain the second information sharing level from the third device.

It may be understood that there is a time difference between the information sharing level and sharing of information. For example, the first device and the second device use a same information sharing level. In the first time, both the first device and the second device use the first information sharing level to perform information sharing. At the second time, when receiving the second information sharing level, both the first device and the second device start to perform information sharing based on the second information sharing level. However, after the second time, the first device may still receive the shared information corresponding to the first information sharing level because: The shared information sent by the second device before the second time based on the first information sharing level, may arrive at the first device after the second time. Similarly, after the second time, the second device may still receive the shared information corresponding to the first information sharing level. Therefore, after receiving a new information sharing level (for example, the foregoing second information sharing level), the first device or the second device may delay for a period of time before starting to perform model training based on the received shared information. This helps ensure that information involved in the model training is shared information corresponding to the second sharing level. Alternatively, a current information sharing level is carried in the shared information, so that the device may select, from the received shared information, the shared information corresponding to the second sharing level to perform model training. Alternatively, the first device or the second device checks whether the received shared information meets a specification of a current information sharing level (for example, the foregoing second information sharing level), and when determining that the received shared information meets the specification of the current information sharing level, performs model training by using the received shared information.

It should be noted that, the foregoing communication method of the first device is applicable to any device in the device group.

In an implementation method, the first device may use information of the first device. (including but not limited to one or more of spectral efficiency, channel state information, location information, a decision parameter, throughput information, quality of service information, packet error rate information, power allocation parameter information, neural network parameter information, signal to interference plus noise ratio information, modulation and coding scheme parameter information, and beam selection parameter information) and third shared information received from another device, and perform deep reinforcement learning training to obtain performance information of the first device. A prerequisite for performing deep reinforcement learning training is collecting samples. Samples are collected in a unit of a time step (time step), and main elements included in samples collected in the time step are observation (observation), an action (action), and a reward (reward). These elements are one-to-one in one time step.

At a beginning of a time step, the third shared information and the information of the first device are used as the observation, for example, the channel state information of the first device and the channel state information in the third shared information are used as the observation. The observation is input to a first neural network model, and the first neural network model outputs an action. The action represents a decision made by the first device under current observation. For example, the action is a power allocation decision made by the first device under input channel state information. After performing the action, the first device obtains a reward at the time step. For example, the reward may be information of the first device under the power allocation decision, for example, may be throughput information of the first device under the power allocation decision. A reward obtained in one time step, for example, the information of the first device under the power allocation policy, may be shared with one or more second devices. A sample for the reinforcement learning training (including observation, an action, and a reward) can be collected in one time step.

In some cases, multiple time steps are required to achieve an effective reward. For example, the first device obtains effective throughput information after making multiple power allocation decisions. In this case, the multiple time steps can be considered as a round, and the effective reward can be obtained at the time step at the end of the round, and the reward at other time steps is zero.

After robust samples are collected, the first neural network is trained through a correlation method (for example, a gradient ascending method), so that a parameter of the first neural network is updated in a direction in which the reward can be increased. Repeat an iterative process of collecting samples and training, and stop training until a preset condition is met or a reward increase is less than a preset threshold. In this case, the first neural network is referred to as a trained first neural network, in other words, the trained model. By using the model, the first device obtains the action based on current observation, and the action causes performance of the first device to change. In this way, performance information of the first device is obtained. The performance information may be provided to the third device, and the third device is used to re-determine the information sharing level of the first device.

The first neural network is a policy network of the deep reinforcement learning. In another possible implementation, the deep reinforcement learning further uses a second neural network, in other words, a value network. The observation and/or the action is input to the second neural network, where the information of the observation and the action may be from the first device and/or the second device. The second neural network outputs an estimated reward, and the first neural network performs training by using the estimated return, so that a parameter of the first neural network is updated in a direction in which the estimated reward can be increased. The second neural network performs training by using a real reward, and a parameter of the second neural network is updated in a direction that can narrow a gap between the estimated reward and the real reward.

In an implementation method, an input of the first neural network includes the information of the first device. (including but not limited to one or more of spectral efficiency, channel state information, location information, a decision parameter, throughput information, quality of service information, packet error rate information, power allocation parameter information, neural network parameter information, signal to interference plus noise ratio information, modulation and coding scheme parameter information, and beam selection parameter information) An input of the second neural network includes information of the first device and third shared information from the at least one second device. In the training phase, the second neural network may provide a more accurate estimated reward by using the shared information, to assist the training of the first neural network. After the training is completed, the first neural network may provide, based on the information of the first device, an optimal decision corresponding to an optimal reward during the training when the information does not need to be shared.

Figure 5:
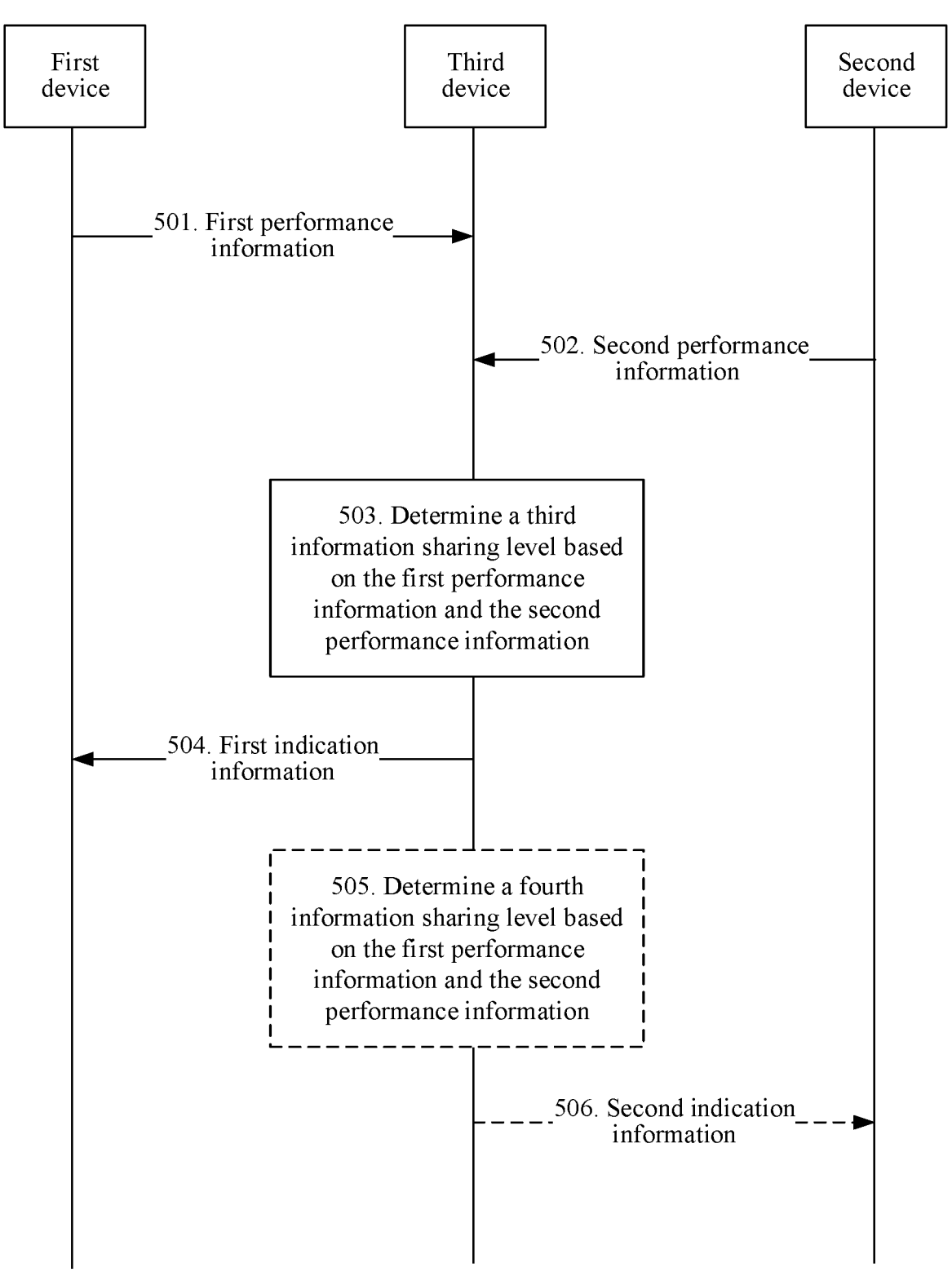
FIG. 5 is a schematic diagram of another communication method according to an embodiment of this application.

Refer to FIG. 5. FIG. 5 is a schematic diagram of a communication method according to an embodiment of this application. The method may be performed by a third device (or a chip configured for a third device) and a device in a device group (or a chip configured for a device). The third device may be a device in the device group, or may be a device outside the device group. For ease of description, an example in which the third device and the device (such as a first device and a second device) in the device group in FIG. 1(*b*) perform the communication method is used below for description.

The method includes the following steps.

Step 501: The third device obtains first performance information of the first device.

For example, the first device may actively report the first performance information of the first device to the third device. Alternatively, the first device sends, to the third device, the first performance information of the first device, according to a request of the third device.

Step 502: The third device obtains second performance information of the second device.

For example, the second device may actively report the second performance information of the second device to the third device. Alternatively, the second device sends, to the third device, the second performance information of the second device, according to the request of the third device.

There is no strict sequence between step 501 and step 502.

Step 503: The third device determines a third information sharing level based on the first performance information and the second performance information.

Step 504: The third device sends first indication information to the first device. The first indication information indicates the third information sharing level.

The third information sharing level is used for information sharing between the first device and the second device. The first device may send shared information of the first device to the second device based on the third information sharing level. For details, refer to the description of an embodiment corresponding to FIG. 4.

According to this solution, the third device determines an information sharing level for the first device, and the first device may send the shared information to another device in the device group based on the information sharing level. The third device may determine a better information sharing level for each device in the device group, so that each device in the device group can perform information sharing based on the better information sharing level, thereby continuously optimizing overall performance of the device group, and achieving an objective that overall performance of the device group is optimized. In addition, when determining a proper information sharing level for a device, the third device further needs to consider performance information of another device in the device group in addition to performance information of the device, to help determine the better information sharing level for the device.

Optionally, the method further includes the following step 505 and step 506.

Step 505: The third device determines a fourth information sharing level based on the first performance information and the second performance information.

The fourth information sharing level is used for information sharing between the first device and the second device. The second device may send the shared information of the second device to the first device based on the fourth information sharing level. For details, refer to the description of an embodiment corresponding to FIG. 4.

Step 506: The third device sends second indication information to the first device. The second indication information indicates the fourth information sharing level.

There is no strict sequence between the foregoing steps 505 and 506 and the foregoing step 503 and step 504.

The following provides several different implementation methods for the third device to determine the third information sharing level of the first device. For the third device, a method for determining the fourth information sharing level of the second device is similar to a method for determining the third information sharing level of the first device, and details are not described again.

Method 1: The third device determines gain efficiency (also referred to as performance gain efficiency) based on the first performance information and the second performance information. If the gain efficiency meets a first condition, the third device determines the third information sharing level based on a preset step.

For example, the first condition is: A gain efficiency change amount corresponding to the gain efficiency is greater than a first threshold. The gain efficiency change amount refers to an absolute value of a difference between a currently determined gain efficiency and a previously determined gain efficiency. When the gain efficiency change amount corresponding to the gain efficiency is greater than the first threshold, it indicates that an increase amount or a decrease amount of the gain efficiency is relatively large, and the information sharing level of the first device may be further adjusted.

For example, when the gain efficiency change amount corresponding to the gain efficiency is greater than the first threshold, and the currently determined gain efficiency is greater than the previously determined gain efficiency, the information sharing level of the first device may be added by a preset step to obtain the third information sharing level of the first device.

For another example, when the gain efficiency change corresponding to the gain efficiency is greater than the first threshold, and the currently determined gain efficiency is less than the previously determined gain efficiency, the information sharing level of the first device may be reduced by a preset step to obtain the third information sharing level of the first device.

Method 2: The third device determines interference information based on the first performance information and the second performance information, and then determines the third information sharing level based on the interference information.

The first performance information indicates one or more of a signal to interference plus noise ratio, co-channel signal interference strength, or reference signal received quality (reference signal received quality, RSRQ). The second performance information indicates one or more of a signal to interference plus noise ratio, co-channel signal interference strength, or RSRQ. The co-channel signal interference strength may be a degree value of interference the device in the device group by another device at a same frequency.

In an implementation method, when both the first performance information and the second performance information indicate a signal to interference plus noise ratio, the third device may obtain an average signal to interference plus noise ratio as the interference information based on the indicated signal to interference plus noise ratio. In another implementation method, when both the first performance information and the second performance information indicate the co-channel signal interference strength, the third device may obtain an average co-channel signal interference strength as the interference information based on the indicated co-channel signal interference strength. In another implementation method, when both the first performance information and the second performance information indicate the RSRQ, the third device may obtain an average RSRQ as the interference information based on the indicated RSRQ.

The interference information determined by the third device may be represented by an interference degree value, to indicate a degree of mutual interference between the devices in the device group or a degree of contention between the devices in the device group. The interference degree value may be the foregoing average signal to interference plus noise ratio, or average co-channel signal interference strength, or average RSRQ, or the like.

In an implementation method, different devices in the device group have a same information sharing level, and a shared information amount corresponding to the information sharing level meets the following requirements: Shared information amount=μ* interference degree value, where μ is a constant. A larger interference degree value indicates a greater mutual interference degree between the devices in the device group, and a higher information sharing level indicates a larger shared information amount. This is because when the devices in the device group interfere with each other at a more serious degree, it means that there is more competition relationship between devices, so that more information needs to be shared between the devices. Therefore, the shared information amount corresponding to the information sharing level is in a positive correlation with the interference degree between the devices. A larger interference degree indicates a higher information sharing level and a larger shared information amount. When there is no interference, information may not be shared.

In an implementation method, for example, a method for determining the third information sharing level based on the interference information may be: determining, based on a predefined or configured correspondence (for example, a correspondence table) between the interference information and the information sharing level, the third information sharing level corresponding to currently determined interference information. In another implementation method, for example, a method for determining the third information sharing level based on the interference information may be: determining, based on a predefined or configured function relationship between the interference information and the information sharing level, the third information sharing level corresponding to currently determined interference information.

Method 3: The third device determines, based on the first performance information and the second performance information, an information importance indication corresponding to the first device, and then determines the third information sharing level according to the information importance indication corresponding to the first device.

The first performance information indicates description information of channel state information and/or sharable information, and the second performance information indicates description information of the channel state information and/or the sharable information. The description information of the shareable information includes one or more of a type of the shareable information, diversity of a data type, a data amount size, data quality, data precision, model reliability, and the like.

In an implementation method, when both the first performance information and the second performance information indicate the channel state information, the third device may determine, based on the indicated channel state information, the information importance indication corresponding to the first device. For example, the first performance information indicates channel quality of the first device, the second performance information indicates channel quality of the second device, and the third device determines, based on the channel quality of the first device and the channel quality of the second device, the information importance indication corresponding to the first device. For example, the channel quality of different devices is sorted. When the channel quality of the first device is sorted higher, it indicates that the channel quality of the first device is better, and a value of the information importance indication corresponding to the first device is larger, so that the first device can share more information with another device.

In another implementation method, when both the first performance information and the second performance information indicate the description information of the sharable information, the third device may determine the information importance indication based on the indicated description information of the sharable information. The description information of the shareable information includes data precision of the shareable information and/or the type of the shareable information. The type of the shareable information includes that the shareable information is information that has been shared and that the shareable information is information that has not been shared.

For example, the first performance information indicates data precision of the shareable information of the first device, the second performance information indicates data precision of the shareable information of the second device, and the third device determines, based on the data precision of the shareable information of the first device and the data precision of the shareable information of the second device, the information importance indication corresponding to the first device. For example, data precision of the sharable information of different devices is sorted. When the data precision of the sharable information of the first device is sorted higher, it indicates that the data precision of the sharable information of the first device is better, and a value of the information importance indication corresponding to the first device is larger. Therefore, the first device can share more information with another device.

For example, the first performance information indicates a type of the sharable information of the first device, the second performance information indicates a type of the sharable information of the second device, and the third device determines, based on the type of the sharable information of the first device and the type of the sharable information of the second device, the information importance indication corresponding to the first device. For example, types of the shareable information of different devices are compared. When the type of shareable information of the first device is that the shareable information is information that has not been shared, and the type of shareable information of the second device is that the shareable information is information that has been shared, it indicates that the sharable information of the first device can improve diversity of training data, and further improve a generalization capability of a trained model. In this case, a value of the information importance indication corresponding to the first device is higher than a value of an information importance indication corresponding to the second device.

Therefore, the first device may share more information with another device than the second device.

In another implementation method, when both the first performance information and the second performance information indicate the model reliability, the third device may determine the information importance indication based on the indicated model reliability. For example, model reliability of different devices is sorted. When model reliability of the first device is sorted higher, it indicates that the model reliability of the first device is higher, and a value of the information importance indication corresponding to the first device is larger. Therefore, the first device may share more information with another device. When the shareable information includes a neural network model, the model reliability may be one or more of diversity of a training sample of the neural network model, a size of a training set, training time, a model size, model prediction accuracy, and the like. More diversity of a training sample, a larger training set, longer training time, a larger model, or a higher model prediction accuracy indicates higher model reliability.

In an implementation method, devices in the device group have different information sharing levels, and a shared information amount corresponding to the information sharing level of the device meets the following: Shared information amount=$\lambda$*a value of an information importance indication corresponding to the device, where $\lambda$ is a constant. A larger value of the information importance indication indicates a higher information sharing level, and a larger amount of shared information and/or a higher frequency of information sharing. This is because when the value of the information importance indication of the device is higher, it means that the information is more likely to enable the device group to obtain a performance gain.

In an implementation method, for example, a method for determining the third information sharing level according to the information importance indication may be: determining, based on a predefined or configured correspondence (for example, a correspondence table) between the value of the information importance indication and the information sharing level, the third information sharing level corresponding to a currently determined value of the information importance indication. As another implementation method, for example, a method for determining the third information sharing level according to the information importance indication may be: determining, based on a predefined or configured function relationship between the value of the information importance indication and the information sharing level, the third information sharing level corresponding to a currently determined value of the information importance indication.

Method 4: The third device determines an environment change indication based on the first performance information and the second performance information, and then determines the third information sharing level based on the environment change indication.

The first performance information indicates an environment change degree of the first device, and the second performance information indicates an environment change degree of the second device. The environment change indication is used to indicate an overall environment change degree of the device group. The environment change degree includes one or more of a traffic flow change degree in an environment, a photographed environment picture change degree, a geographical location change degree, and the like.

In an implementation method, a value of the environment change indication may be an average value of values of environment change degrees indicated by a performance information reported by devices in the device group. For example, when the device group includes the first device and the second device, the value of the environment change indication is an average value of a value of the environment change degree of the first device indicated by the first performance information and a value of the environment change degree of the second device indicated by the second performance information. In another implementation method, the value of the environment change indication may be a maximum value or a minimum value of values of environment change degrees indicated by the performance information reported by the devices in the device group. In another implementation method, the value of the environment change indication may be a sum of values of environment change degrees indicated by performance information reported by devices in the device group. For example, when the device group includes the first device and the second device, the value of the environment change indication is a sum of a value of the environment change degree of the first device indicated by the first performance information and a value of the environment change degree of the second device indicated by the second performance information.

In an implementation method, for example, a method for determining the third information sharing level according to the environment change indication may be: A value range of the environment change indication is divided into three ranges, where the value ranges are range 1, range 2, and range 3 in ascending order. When the value of the environment change indication falls into the range 3, the third information sharing level is determined as an initial information sharing level, in other words, adjustment of an optimal information sharing level is restarted. When the value of the environment change indication falls into the range 2, the third information sharing level is determined as a current information sharing level of the first device+a set step (for example, the set step is 1). When the value of the environment change indication falls into the range 1, the current information sharing level is kept unchanged, in other words, the third information sharing level is determined as the current information sharing level of the first device.

It should be noted that, in an embodiment corresponding to FIG. 5, the third device determines the information sharing level of the first device and/or the information sharing level of the second device based on the performance information obtained from the two devices (to be specific, the first device and the second device). In a specific implementation, alternatively, the third device may obtain the performance information from three or more devices in the device group, and determine an information sharing level of each device based on the obtained performance information. For example, to improve accuracy of determining the information sharing level by the third device, the third device may obtain performance information from all devices in the device group, and determine the information sharing level of each device based on the obtained performance information.

The following describes the foregoing solutions provided in embodiments of this application with reference to a specific application scenario.

Currently, a development trend of communication technologies is a high frequency and a large bandwidth. However, the high frequency means fast attenuation. As a result, deployment of radio access network devices becomes denser, and a radio signal environment becomes more complex. To ensure coverage, there is inevitably an overlapping area between cells. An overlapping area under an existing radio access network device density is acceptable. In the future, a higher radio access network device density and narrower beams increase a proportion of the overlapping area. Therefore, inter-cell interference management will become one of key technical challenges.

Joint power allocation for multiple cells is a typical scenario of inter-cell interference management. When a cell increases transmit power for coverage thereof, interference may occur on neighboring cells. Theoretically, there is an equilibrium point on the Pareto frontier in this problem. Each cell set a power allocation result at this point, thereby maximizing joint overall spectral efficiency of the multiple cells. Because a value of power allocation is limited, how to find the equilibrium point is a non-convex problem that is not easy to solve.

Currently, model-based algorithm that can achieve sub-optimal joint power allocation is included, for example, a weighted minimum mean square error algorithm and a fractional programming algorithm. However, these algorithms require global latest channel state information, but in practice, obtaining the information is costly and has high computational complexity.

With the development of machine learning, model-free data-driven deep reinforcement learning is proposed to solve many non-convex problems. Subsequently, multi-device reinforcement learning can achieve the Nash equilibrium in the mutual game between devices. Compared with the optimization algorithm, an advantage of reinforcement learning is that after being trained, an optimization problem does not need to be solved repeatedly, but a result can be directly output.

Therefore, when the reinforcement learning algorithm is actually applied, an impact of a training time consumption needs to be considered. It is assumed that a training gain within a period of time is referred to as gain efficiency, which is expressed as follows:

$$E_\theta = \frac{R_\theta}{T} | \theta \qquad (1)$$

$E_\theta$ is the gain efficiency under a condition that an information combination $\theta$ is used as a training input. An objective is to find an information combination $\hat{\theta}$, thereby maximizing a performance gain $R_\theta$ in training time T. In an implementation method, the performance gain $R_\theta$ may be represented by an average performance gain, where the average performance gain is an average value of performance gains of devices in the device group. In another implementation method, the performance gain $R_\theta$ may also be represented by a sum of performance gains, where the sum of performance gains is a sum of performance gains of devices in the device group.

Figure 6:
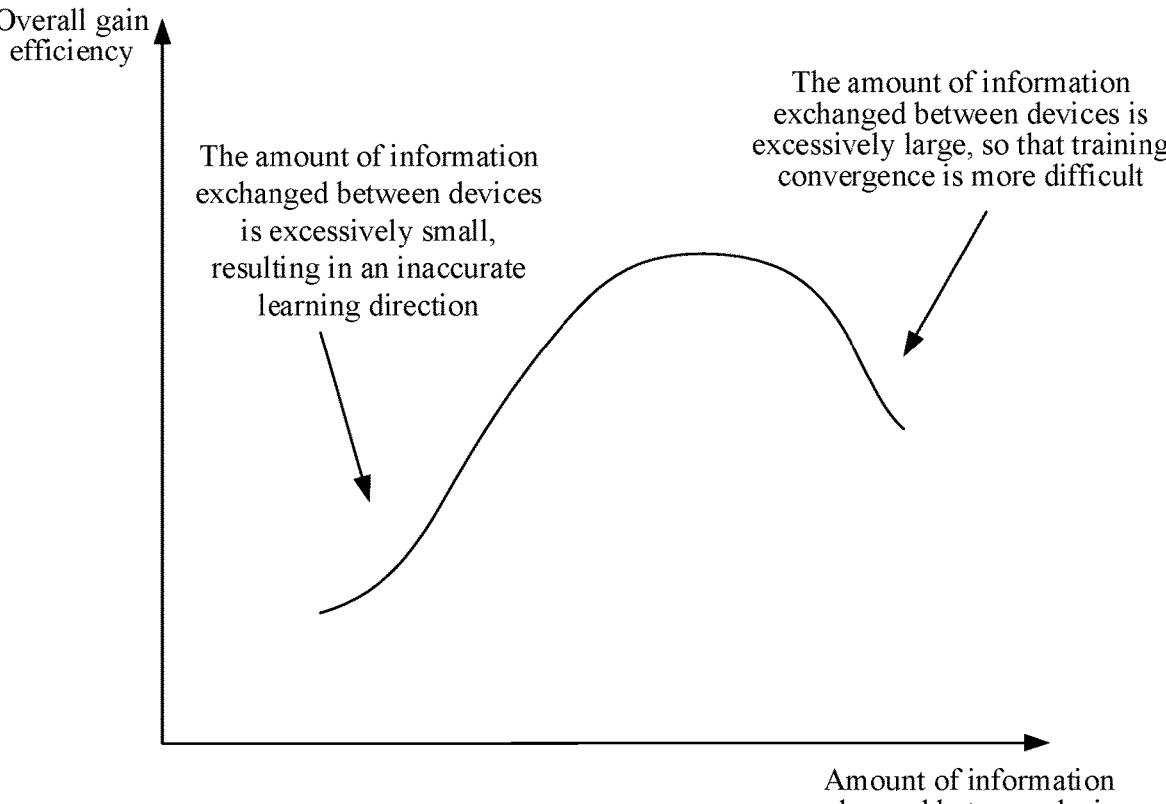
FIG. 6 is a schematic diagram of a relationship between gain efficiency of training and an amount of information exchanged between devices.

FIG. 6 is a schematic diagram of a relationship between gain efficiency of training and an amount of information exchanged between devices. When the amount of information exchanged between devices is excessively small, a training direction is not accurate, and performance gain is not significant. With the increase of information exchanged between devices, instability in training decreases, the performance gain increases, and overall gain efficiency increases. However, when the amount of information exchanged between the devices is excessively large, communication overheads first increase. In addition, because a proportion of valid information in the information exchanged decreases, a convergence difficulty of training increases, time required for training increases, and the overall gain efficiency decreases.

The valid information is information that affects overall performance of the device group. Some information has a great impact on the overall performance of the device group, for example, a beam direction of the device. Some information has little impact on the overall performance of the device group, such as the crystal oscillator model of the device. Some information has no effect on the overall performance of the device group, such as the temperature of the device. A large amount of redundant information is sent at the beginning of training, resulting in waste of a resource. In addition, because training of the neural network is data-driven, the neural network has no bias towards data at the beginning of training. If a proportion of effective information is excessively small, the neural network needs more time to train, resulting in reduced gain efficiency.

In a possible implementation, T in the gain efficiency formula (1) may be further affected by one or more of the following statistical results:

a total amount of information transmitted by the information receiving and sending combination $\theta$, the information receiving and sending combination $\theta$ and an air interface resource consumed during training thereof, the information receiving and sending combination $\theta$ and a computing resource consumed during training thereof, and the information receiving and sending combination $\theta$ and energy consumed during training thereof In a possible implementation, in the gain efficiency formula (1), $R_\theta$ may be replaced with a function about $R_\theta$, for example, $R_\theta$ may be replaced with a square root function of $R_\theta$.

In a possible implementation, T in the gain efficiency formula (1) may be replaced with a function about T. For example, T may be replaced with a square root function of T.

In a possible implementation, a parameter of the gain efficiency formula (1) may be obtained from a signaling message. (for example, an RRC message, a MAC CE, or DCI) For example, if T is obtained from the signaling message, and T is 60 seconds, the unit time for calculating the gain efficiency is 60 seconds, in other words, the training ends 60 seconds after the training starts, the performance gain at this time is calculated, and the performance gain is divided by 60 seconds. Therefore, finding the appropriate amount of the information exchanged is the key to maximize gain efficiency.

Therefore, in an embodiment of this application, a related design of the foregoing information sharing level may be used for joint optimization of multiple devices in a communication network, to implement adaptive adjustment of the information sharing level, accelerate training convergence, and obtain maximum gain efficiency with minimum information sharing overheads.

Figure 7:
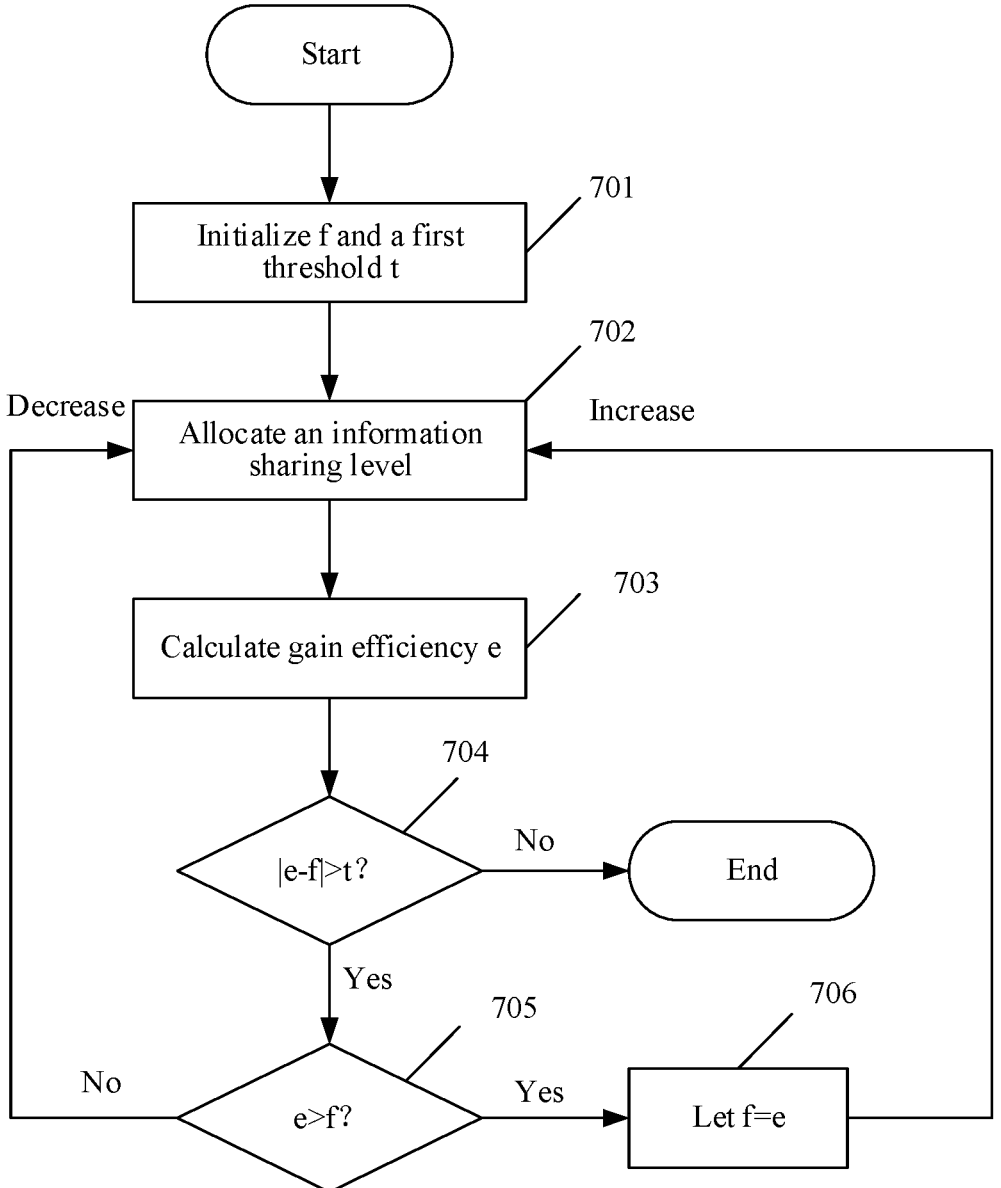
FIG. 7 is a schematic diagram of an information sharing level adjustment process according to an embodiment of this application.

Refer to FIG. 7. FIG. 7 is a schematic diagram of an information sharing level adjustment process according to an embodiment of this application. This embodiment is a specific example when the foregoing embodiments corresponding to FIG. 5 are combined. This embodiment provides a process of adjusting the information sharing level for a device in a device group. This embodiment may be executed by the foregoing third device.

An objective of adjusting the information sharing level is to maximize the overall gain efficiency in the device, in other words, a greater performance gain can be achieved by training in a unit time. Performance may be a throughput, spectral efficiency, a signal-to-noise ratio, or the like in a communication network.

In this example, information sharing levels of all devices in the device group are set to be kept synchronous, in other words, the information sharing levels of all devices in the device group are the same.

Refer to FIG. 7. The method includes the following steps.

Step 701: Initialize f and a first threshold t.

f is used to represent gain efficiency calculated last time, and f is initialized to 0.

The first threshold t is used to determine when the adjustment ends. A value of t may be set based on an empirical value or according to a preset rule. For example, t is set to 0.1, or the like.

Step 702: Allocate the information sharing level.

When the information sharing level is allocated to the devices in the device group for the first time, all information sharing levels of the devices in the device group may be set to a lowest information sharing level, for example, set to level 1.

Subsequently, the third device may allocate the information sharing level to the devices in the device group based on a set step. For example, when the information sharing level is increased (or improved), a current information sharing level is increased (or improved) by the set step. When the information sharing level is reduced (or lowered), the current information sharing level is reduced (or lowered) by the set step.

Optionally, the step is set to 1, in other words, one level is increased or decreased each time.

A lower information sharing level indicates less information to be shared. Starting from the lowest level, the level gradually increases, and the shared information gradually increases, which is in line with the principle of saving a radio interface.

Step 703: Calculate gain efficiency e.

The devices in the device group may share information with each other based on the information sharing level allocated by the third device. Then, each device may perform model training based on information of the device and shared information received from another device, for example, training set duration T. Then, each device separately obtains a performance gain within set duration T through calculation, and then separately sends the performance gain to the third device.

After receiving the performance gain sent by each device, the third device may calculate an average performance gain, and then calculate current gain efficiency e based on the average performance gain and the foregoing formula (1).

Alternatively, after receiving the performance gain sent by each device, the third device may calculate a performance gain sum, and then calculate current gain efficiency e based on the performance gain sum and the foregoing formula (1).

Step 704: Determine whether |e-f| is greater than t.

|e-f| represents an absolute value of a difference between e and f, to be specific, an absolute value of a difference between current gain efficiency and previous gain efficiency, in other words, a gain efficiency change corresponding to the gain efficiency.

When |e-f| is less than or equal to t, it indicates that the gain efficiency change amount is relatively small, and the adjustment of the information sharing level is ended.

When |e-f| is greater than t, it indicates that the gain efficiency changes greatly, and the information sharing level may be further adjusted.

Step 705: Determine whether e is greater than f.

When e is greater than f, step 706 is performed, where f=e is set, and then step 702 is performed. The third device increases the information sharing level for the devices in the device group based on the set step. For example, the information sharing level of the devices in the device group is increased by one level.

When e is less than or equal to f, step 702 is performed. The third device lowers the information sharing level for the devices in the device group based on the set step. For example, the information sharing levels of the devices in the device group are all lowered by one level.

Step 706: Let f=e.

To be specific, the current gain efficiency is recorded with f.

Figures 8, 9:
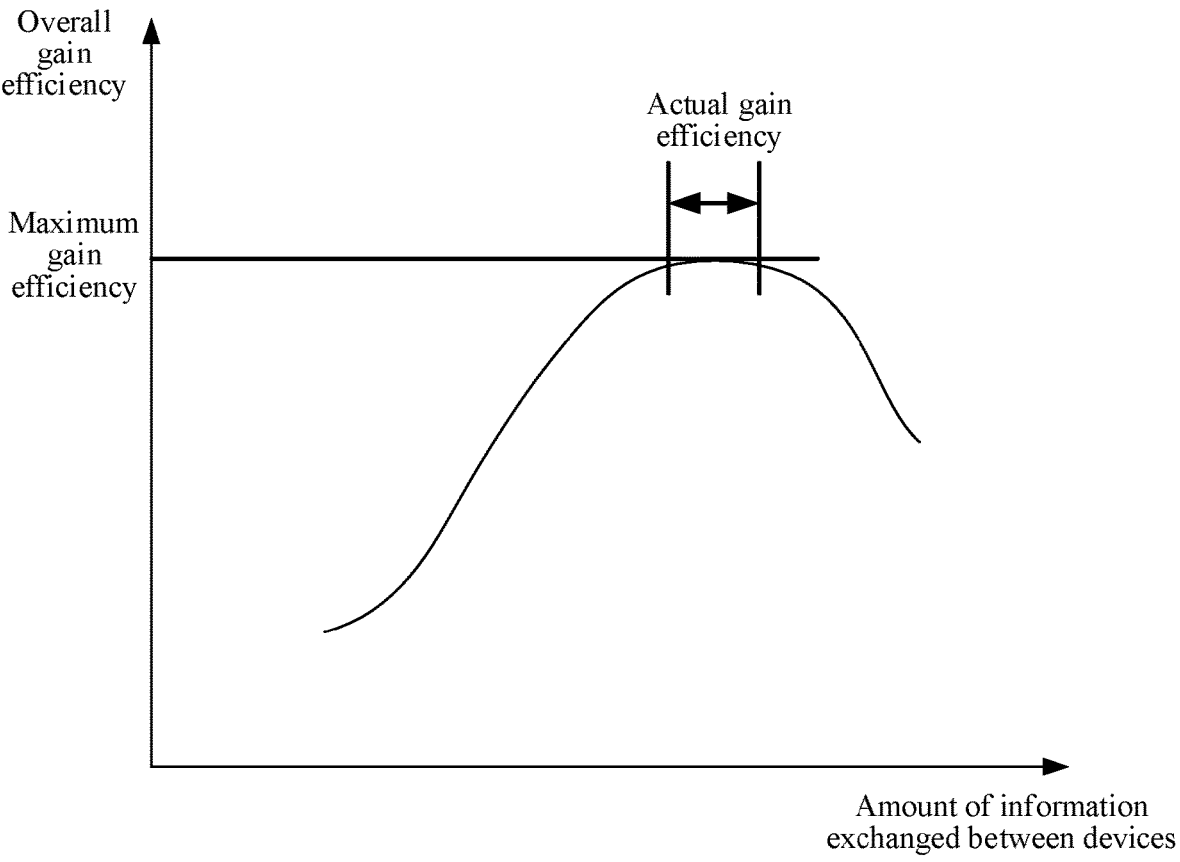
FIG. 8 is a schematic diagram of a relationship between actual gain efficiency and an amount of information exchanged between devices.
FIG. 9 is a schematic diagram of a communication apparatus according to an embodiment of this application.

Refer to FIG. 8. FIG. 8 is a schematic diagram of a relationship between actual gain efficiency and the amount of information exchanged between devices. According to this solution, a difference between the actual gain efficiency and the maximum gain efficiency is not large, in other words, the difference between the actual gain efficiency and the maximum gain efficiency is less than a small threshold.

After the information sharing level is adjusted, the neural network may be retrained, in other words, a structure of the neural network may be redesigned, or a parameter of the neural network is re-initialized by Gaussian distribution.

In another possible implementation, after the information sharing level is adjusted, a neural network trained at a previous information sharing level is used, in other words, a structure and a parameter of the neural network are reused to start training. In this case, an input dimension of the neural network needs to be compatible with different information sharing levels. In addition, because the trained neural network parameter is used, training time may not be considered when the gain efficiency is calculated, but other indicators such as resource consumption and an amount of transmitted information may be considered.

According to this solution, each device in the device group may send the shared information to another device in the device group based on the information sharing level, and the information sharing level may change dynamically, so that an amount of the shared information may also change dynamically. This enables the devices in the device group to dynamically adjust the amount of shared information, thereby continuously optimizing overall performance of the device group, and achieving an objective that overall performance of the device group is optimized.

It may be understood that, to implement the functions in the foregoing embodiments, a base station and a terminal include a corresponding hardware structure and/or software module for performing the functions. A person skilled in the art is easily aware that, based on the units and the method steps in the examples described in embodiments disclosed in this application, this application can be implemented through hardware or a combination of hardware and computer software. Whether a function is executed through hardware or hardware driven by computer software depends on particular application scenarios and design constraint conditions of the technical solutions.

Refer to FIG. 9. FIG. 9 is a schematic diagram of a communication apparatus according to an embodiment of this application. The communication apparatus is configured to implement steps corresponding to the first device, the second device, or the third device in the foregoing embodiments. As shown in FIG. 9, the communication apparatus 900 includes a transceiver unit 910 and a processing unit 920.

In a first embodiment, the communication apparatus is configured to implement the steps corresponding to the first device in the foregoing embodiments.

The processing unit 920 is configured to obtain a first information sharing level of the first device; and obtain a second information sharing level of the first device; and the transceiver unit 910, configured to send, to at least one second device, first shared information corresponding to the first information sharing level; and send, to the at least one second device, second shared information corresponding to the second information sharing level. The second information sharing level is different from the first information sharing level, the second shared information is not exactly the same as the first shared information. The first shared information and the second shared information are used for model training.

In a possible implementation method, the transceiver unit 910 is further configured to send indication information to a third device, where the indication information indicates at least two information sharing levels, and the at least two information sharing levels include the first information sharing level. The processing unit 920, configured to obtain a first information sharing level of the first device, specifically including: obtaining the first information sharing level from the third device by using the transceiver unit 910.

In a possible implementation method, the indication information further indicates shared information ranges respectively corresponding to the at least two information sharing levels.

In a possible implementation method, the first shared information is a portion of the second shared information. Alternatively, the second shared information is a portion of the first shared information.

In a possible implementation method, the transceiver unit 910 is further configured to separately receive third shared information from the at least one second device. The third shared information is used for model training. The processing unit 920 is further configured to determine performance information based on the third shared information. The transceiver unit 910 is further configured to send the performance information to a third device, where the performance information is used for determination of an information sharing level. The processing unit 920 is configured to obtain a second information sharing level of the first device, including: obtaining the second shared information level from the third device by using the transceiver unit 910.

In a possible implementation method, the first information sharing level includes one or more of the following:
- a spectral efficiency level, where the spectral efficiency level is non-shared spectral efficiency or shared spectral efficiency;
- a channel state sharing level, where the channel state sharing level is non-shared channel state information or shared channel state information;
- a parameter sharing level, where the parameter sharing level is a non-shared parameter or a shared parameter; and
- a location sharing level, where the location sharing level is non-shared location information or shared location information.

In the second embodiment, the communication apparatus is configured to implement steps corresponding to the third device in the foregoing embodiments.

The processing unit 920 is configured to obtain first performance information of the first device and second performance information of the second device; and determine a third information sharing level based on the first performance information and the second performance information. The transceiver unit 910 is configured to send first indication information to the first device, where the first indication information indicates the third information sharing level. The third information sharing level is used for information sharing between the first device and the second device.

In a possible implementation method, the processing unit 920 is further configured to determine a fourth information sharing level based on the first performance information and the second performance information, where the fourth information sharing level is used for information sharing between the first device and the second device. The transceiver unit 910 is further configured to send second indication information to the second device, where the second indication information indicates the fourth information sharing level.

In a possible implementation method, that the processing unit 920 is configured to determine a third information sharing level based on the first performance information and the second performance information, specifically including: determining gain efficiency based on the first performance information and the second performance information, where the gain efficiency meets a first condition; and determining the third information sharing level based on a preset step.

In a possible implementation method, the first condition is: A gain efficiency change amount corresponding to the gain efficiency is greater than a first threshold.

In a possible implementation method, that the processing unit 920 is configured to determine the third information sharing level based on a preset step includes: adding the preset step to an information sharing level of the first device, to obtain the third information sharing level; or decreasing the preset step from the information sharing level of the first device, to obtain the third information sharing level.

In a possible implementation method, that the processing unit 920 is configured to determine a third information sharing level based on the first performance information and the second performance information, including: determining interference information based on the first performance information and the second performance information; and determining the third information sharing level based on the interference information.

In a possible implementation method, the first performance information indicates a signal to interference plus noise ratio and/or co-channel signal interference strength, and the second performance information indicates a signal to interference plus noise ratio and/or co-channel signal interference strength.

Optionally, the communication apparatus may further include a storage unit. The storage unit is configured to store data or an instruction (which may also be referred to as code or a program). The foregoing units may interact with or be coupled to the storage unit to implement a corresponding method or function. For example, the processing unit 920 may read the data or the instruction in the storage unit, so that the communication apparatus implements the methods in the foregoing embodiments.

It should be understood that division of the foregoing units in the communication apparatus is merely division of logical functions. In actual implementation, all or some units may be integrated into one physical entity, or may be physically separated. In addition, all units in the communication apparatus may be implemented in a form in which software invokes the units by using a processing element; or can also be implemented in a form of hardware. Alternatively, some units may be implemented in a form in which software invokes the units by using a processing element, and some units may be implemented in a form of hardware. For example, each unit may be a separately disposed processing element, or may be integrated into a chip in the communication apparatus for implementation. In addition, each unit may be stored in a memory in a form of a program, and a processing element in the communication apparatus invokes and executes a function of the unit. In addition, all or some of these units may be implemented integrally, or independently. The processing element described herein may also be a processor, and may be an integrated circuit having a signal processing capability. During implementation, steps in the foregoing methods or the foregoing units may be implemented by using a hardware integrated logic circuit in a processor element, or may be implemented in the form of software invoked by the processing element.

In an example, a unit in any one of the foregoing communication apparatuses may be one or more integrated circuits configured to implement the foregoing method, for example, one or more application specific integrated circuits (application specific integrated circuits, ASICs), one or more microprocessors (digital signaling processors, DSPs), or one or more field programmable gate arrays (field programmable gate arrays, FPGAs), or a combination of at least two of these integrated circuit forms. For another example, when the units in the communication apparatus may be implemented in a form in which the processing element schedules a program, the processing element may be a general-purpose processor, for example, a central processing unit (central processing unit, CPU) or another processor that can invoke the program. For still another example, the units may be integrated and implemented in a form of a system-on-a-chip (system-on-a-chip, SOC).

Figure 10:
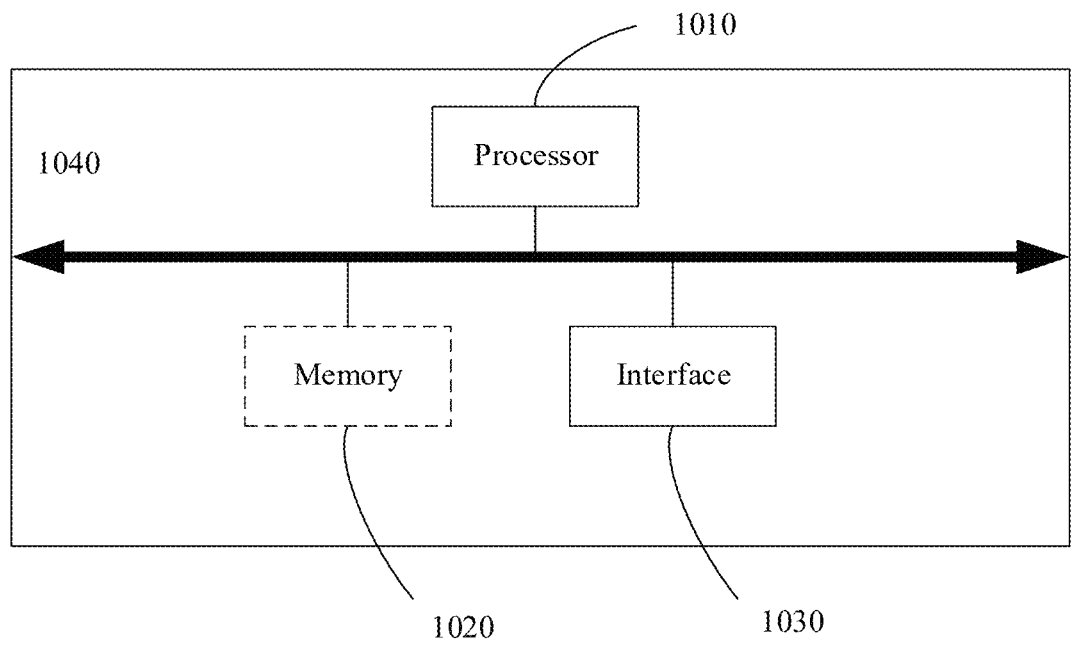
FIG. 10 is a schematic diagram of another communication apparatus according to an embodiment of this application.

Refer to FIG. 10. FIG. 10 is a schematic diagram of a communication apparatus according to an embodiment of this application. The communication apparatus is configured to implement an operation of the first device, the second device, or the third device in the foregoing embodiments. As shown in FIG. 10, the communication apparatus includes: a processor 1010 and an interface 1030. The processor 1010 is coupled to the interface 1030. The interface 1030 is configured to communicate with another device. The interface 1030 may be a transceiver or an input/output interface. The interface 1030 may be, for example, an interface circuit. Optionally, the communication apparatus further includes a memory 1020, configured to store an instruction executed by the processor 1010, store input data required by the processor 1010 to run the instruction, or store data generated after the processor 1010 runs the instruction.

The method executed by the first device, the second device, or the third device in the foregoing embodiments may be implemented by the processor 1010 invoking the program stored in the memory (which may be a memory 1020 in the first device, the second device, or the third device, or an external memory). In other words, the first device, the second device, or the third device may include the processor 1010. The processor 1010 invokes the program in the memory to perform the method performed by the first device, the second device, or the third device in the foregoing method embodiments. The processor herein may be an integrated circuit having a signal processing capability, for example, the CPU. The first device, the second device, or the third device may be implemented by one or more integrated circuits configured to implement the foregoing methods. Examples are as follows: one or more ASICs, one or more microprocessors DSPs, one or more FPGAs, or a combination of at least two of these integrated circuit forms. Alternatively, the foregoing implementations may be combined.

Details are as follows: A function/implementation process of the transceiver unit 910 and the processing unit 920 in FIG. 9 may be implemented by the processor 1010 in the communication apparatus 1040 shown in FIG. 10 invoking a computer executable instruction stored in the memory 1020. Alternatively, a function/implementation process of the processing unit 920 in FIG. 9 may be implemented by the processor 1010 in the communication apparatus 1040 shown in FIG. 10 invoking a computer executable instruction stored in the memory 1020. A function/implementation process of the transceiver unit 910 in FIG. 9 may be implemented by the interface 1030 in the communication apparatus 1040 shown in FIG. 10. For example, the function/implementation process of the transceiver unit 910 may be implemented by the processor invoking a program instruction in the memory to drive the interface 1030.

When the communication apparatus is a chip used in a terminal device, the chip in the terminal device implements functions of the terminal device in the foregoing method embodiments. The terminal device chip receives information from another module (for example, a radio frequency module or an antenna) in a terminal device, where the information comes from another terminal device or network device. Alternatively, the terminal device chip sends information to another module (for example, a radio frequency module or an antenna) in the terminal device, where the information is sent by the terminal device to another terminal device or network device.

When the communication apparatus is a chip used in a network device, the chip in the network device implements functions of the network device in the foregoing method embodiments. The network device chip receives information from another module (for example, a radio frequency module or an antenna) in the network device, where the information comes from another network device or terminal device. Alternatively, the network device chip sends information to another module (for example, a radio frequency module or an antenna) in the network device. The information is sent by the network device to another network device or terminal device.

A person of ordinary skill in the art may understand that the first number, the second number, and the like in this application are merely distinguished for ease of description, but are not intended to limit a scope of embodiments of this application, and indicate a sequence. The term "and/or" is an association relationship for describing associated objects and represents that three relationships may exist. For example, A and/or B may represent the following three cases: Only A exists, both A and B exist, and only B exists. The character "/" generally indicates that associated objects are in an "or" relationship. "At least one" refers to one or more. At least two means two or more. "At least one", "any one", or a similar expression thereof, refers to any combination of these items, including any combination of a single item or a plural item. For example, at least one of a, b, or c may represent: a, b, c, a-b, a-c, b-c, or a-b-c, where a, b, and c may be one or more. "Multiple" refers to two or more, and other quantifiers are similar.

It should be understood that sequence numbers of the foregoing processes do not mean execution sequences in various embodiments of this application. The execution sequences of the processes are determined according to functions and internal logic of the processes, and are not construed as any limitation on the implementation processes of embodiments of the present invention.

It may be clearly understood by a person skilled in the art that, for convenient and brief description, for a detailed working process of the foregoing system, apparatus, and units, refer to a corresponding process in the foregoing method embodiments, and details are not described herein again.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instruction is loaded and executed on a computer, the procedures or functions according to embodiments of this application are all or partially generated. The computer may be a general-purpose computer, a dedicated computer, a computer network, or any other programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

The various illustrative logical units and circuits described in embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. A processor may also be achieved through a combination of computing apparatuses, such as combination of a digital signal processor and a microprocessor, multiple microprocessors, one or more microprocessors and one digital signal processor, or any other similar configurations.

Steps of the methods or algorithms described in embodiments of this application may be directly embedded into hardware, a software unit executed by a processor, or a combination thereof. The software unit may be stored in a random access memory (Random Access Memory, RAM), a flash memory, a read-only memory (Read-Only Memory, ROM), an EPROM memory, an EEPROM memory, a register, a hard disk, a removable disk, a CD-ROM or any other form of storage media in the art. For example, the storage media may be connected to a processor so that the processor may read information from the storage media and may save the information in the storage media. Optionally, the storage media may also be integrated into the processor. The processor and the storage media may be configured in an ASIC.

These computer program instructions may also be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

In one or more example designs, the foregoing functions described in this application may be implemented by hardware, software, firmware, or any combination of the three. If the present invention is implemented by software, these functions may be stored in a computer-readable medium or are transmitted to the computer-readable medium in a form of one or more instructions or code. The computer-readable medium includes a computer storage medium and a communication medium that facilitates transfer of a computer program from one place to another. The storage media may be an available medium that can be accessed by any general or special computer. For example, such a computer-readable medium may include but is not limited to a RAM, a ROM, an EEPROM, a CD-ROM, or another optical disc storage, a disk storage or another magnetic storage apparatus, or any other medium that may be used to carry or store program code, where the program code is in a form of an instruction or a data structure or in a form that can be read by a general or special computer or a general or special processor. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in a defined computer-readable medium. The disc (disc) and the disc (disc) include a compressed disc, a laser disc, an optical disc, and a digital versatile disc (Digital Versatile Disc, DVD for short), a floppy disk, and a Blu-ray disc, where disks usually copy data magnetically, while discs usually copy data optically with lasers. The foregoing combination may also be included in the computer-readable medium.

A person of skill in the art is aware that in one or more of the foregoing examples, the functions described in this application may be implemented by using hardware, software, firmware, or any combination thereof. When the functions are implemented by software, these functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium accessible to a general-purpose or special-purpose computer.

The objectives, technical solutions, and benefits of this application are further described in detail in the foregoing specific implementations. It should be understood that the foregoing descriptions are merely specific implementations of this application, but are not intended to limit the protection scope of this application. Any modification or improvement made based on the technical solutions of this application shall fall within the protection scope of this application. The foregoing description in the specification of this application may enable any person skilled in the art to utilize or implement the content of this application, and any modification based on the disclosed content shall be considered significant in the art. The basic principles described in this application may be applied to other variations without departing from the essence and scope of the invention of this application. The content disclosed in this application is not limited to the described embodiments and designs, but may further be extended to a maximum scope that is consistent with the principles of this application and new features disclosed in this application.

Although this application has been described with refer-ence to specific features and embodiments thereof, it is significant that various modifications and combinations may be made to this application without departing from the spirit and scope of this application. Correspondingly, the specifi-cation and the accompanying drawings are merely an example of descriptions of this application defined by the appended claims, and are deemed to have covered any and all modifications, variations, combinations, or equivalents that fall within the scope of this application. It is clear that a person skilled in the art can make various modifications and variations to this application without departing from the scope of this application. Therefore, this application is intended to cover these modifications and variations of this application provided that these modifications and variations fall within the scope defined by the following claims of this application and equivalent technologies thereof.

What is claimed is:

1. A communication method, comprising:
obtaining, by a first device, a first information sharing level of the first device;
sending, by the first device to a second device, first shared information corresponding to the first information shar-ing level;
obtaining, by the first device, a second information shar-ing level of the first device from a third device;
sending, by the first device to the second device, second shared information corresponding to the second infor-mation sharing level, wherein
the second information sharing level is different from the first information sharing level, and the second shared information is not exactly the same as the first shared information;
separately receiving, by the first device, third shared information from the second device, wherein the first shared information, the second shared information, and the third shared information are for neural network model training;
determining, by the first device, performance information based on the third shared information; and
sending, by the first device, the performance information to the third device, wherein the performance informa-tion is for information sharing level determination for the first device and the second device.

2. The method according to claim 1, further comprising:
sending indication information to a third device, wherein the indication information indicates at least two infor-mation sharing levels, and the at least two information sharing levels comprise the first information sharing level, and
wherein the step of obtaining the first information sharing level of the first device comprises:
obtaining the first information sharing level from the third device.

3. The method according to claim 2, wherein the indica-tion information further indicates shared information ranges respectively corresponding to the at least two information sharing levels.

4. The method according to claim 1, wherein
the first shared information is a portion of the second shared information, or
the second shared information is a portion of the first shared information.

5. The method according to claim 1, wherein the first information sharing level comprises:
a spectral efficiency sharing level, wherein the spectral efficiency sharing level is non-shared spectral effi-ciency or shared spectral efficiency,
a channel state sharing level, wherein the channel state sharing level is non-shared channel state information or shared channel state information,
a parameter sharing level, wherein the parameter sharing level is a non-shared parameter or a shared parameter, or
a location sharing level, wherein the location sharing level is non-shared location information or shared location information.

6. A communication method, comprising:
obtaining, by a third device, first performance information of a first device and second performance information of a second device;
determining, by the third device, a third information sharing level based on the first performance informa-tion and the second performance information; and
sending, by the third device, first indication information to the first device, wherein the first indication information indicates the third information sharing level, and the third information sharing level is for information shar-ing between the first device and the second device, and wherein the information sharing between the first device and the second device is used for neural network model training.

7. The method according to claim 6, further comprising:
determining a fourth information sharing level based on the first performance information and the second per-formance information; and
sending second indication information to the second device, wherein the second indication information indi-cates the fourth information sharing level,
wherein the fourth information sharing level is for infor-mation sharing between the first device and the second device.

8. The method according to claim 6, wherein the step of determining the third information sharing level comprises:
determining gain efficiency based on the first performance information and the second performance information, wherein the gain efficiency meets a first condition; and
determining the third information sharing level based on a preset step.

9. The method according to claim 8, wherein the first condition is that a gain efficiency change amount corre-sponding to the gain efficiency is greater than a first thresh-old.

10. The method according to claim 9, wherein the step of determining the third information sharing level based on the preset step comprises:
adding the preset step to the information sharing level of the first device to obtain the third information sharing level; or
decreasing the preset step size from the information sharing level of the first device, to obtain the third information sharing level.

11. The method according to claim 6, wherein the step of determining the third information sharing level comprises:
determining interference information based on the first performance information and the second performance information; and
determining the third information sharing level based on the interference information.

12. The method according to claim 11, wherein the first performance information indicates a signal to interference plus noise ratio or co-channel signal interference strength, and the second performance information indicates the signal to interference plus noise ratio or the co-channel signal interference strength.

13. A first device, comprising:

a transceiver;

a memory storing executable instructions;

one or more processors configured to execute the executable instructions to perform operations of:

obtaining a first information sharing level of the first device;

obtaining a second information sharing level of the first device from a third device;

sending, to a second device, first shared information corresponding to the first information sharing level;

sending, to the second device, second shared information corresponding to the second information sharing level, wherein the second information sharing level is different from the first information sharing level, and the second shared information is not exactly the same as the first shared information;

separately receiving third shared information from the second device, wherein the first shared information, the second shared information, and the third shared information are for neural network model training;

determining performance information based on the third shared information; and sending the performance information to the third device, wherein the performance information is for information sharing level determination for the first device and the second device.

14. The first device according to claim 13, wherein the one or more processors are further configured to execute the executable operations to perform an operation of:

send indication information to the third device, wherein the indication information indicates at least two information sharing levels, and the at least two information sharing levels comprise the first information sharing level, wherein the operation of obtaining the first information sharing level of the first device comprises:

obtaining the first information sharing level from the third device.

15. The first device according to claim 14, wherein the indication information further indicates shared information ranges respectively corresponding to the at least two information sharing levels.

16. The first device according to claim 13, wherein the first shared information is a portion of the second shared information, or the second shared information is a portion of the first shared information.

17. The first device according to claim 13, wherein the first information sharing level comprises:

a spectral efficiency sharing level, wherein the spectral efficiency sharing level is non-shared spectral efficiency or shared spectral efficiency, a channel state sharing level, wherein the channel state sharing level is non-shared channel state information or shared channel state information, a parameter sharing level, wherein the parameter sharing level is a non-shared parameter or a shared parameter, or a location sharing level, wherein the location sharing level is non-shared location information or shared location information.

* * * * *